United States Patent
Raza et al.

(10) Patent No.: US 10,871,618 B2
(45) Date of Patent: Dec. 22, 2020

(54) CONNECTIVITY APPLIANCE

(71) Applicant: Fiber Mountain, Inc., Cheshire, CT (US)

(72) Inventors: Mohammad H. Raza, Wallingford, CT (US); Boby Joseph, Shrewsbury, MA (US); David G. Stone, Irvine, CA (US); Aristito Lorenzo, Plantsville, CT (US); Ronald M. Plante, Prospect, CT (US); Phuc Minh Ly, Waterbury, CT (US); Robert O'Neil, Bethel, CT (US); John R. Lagana, West Nyack, NY (US)

(73) Assignee: Fiber Mountain, Inc., Cheshire, CT (US)

( * ) Notice: Subject to any disclaimer, the term of this patent is extended or adjusted under 35 U.S.C. 154(b) by 0 days.

(21) Appl. No.: 15/914,918

(22) Filed: Mar. 7, 2018

(65) Prior Publication Data

US 2018/0259722 A1 Sep. 13, 2018

Related U.S. Application Data

(60) Provisional application No. 62/468,252, filed on Mar. 7, 2017.

(51) Int. Cl.
*G02B 6/00* (2006.01)
*G02B 6/38* (2006.01)
(Continued)

(52) U.S. Cl.
CPC ......... *G02B 6/3897* (2013.01); *G02B 6/3885* (2013.01); *G02B 6/3893* (2013.01);
(Continued)

(58) Field of Classification Search
CPC .. G02B 6/4452; G02B 6/3897; G02B 6/4471; G02B 6/4446; G02B 6/4457; G02B 6/00
See application file for complete search history.

(56) References Cited

U.S. PATENT DOCUMENTS 9,488,795 B1 11/2016 Lane et al.
2004/0253878 A1 12/2004 Delara
(Continued)

OTHER PUBLICATIONS

"AllPath Connect LS-2525"; Product Datasheet; Nov. 30, 2016; http://www.fibermountain.com/images/PDF_Download_Files/LS-2525_DS_FINAL_11-30-16.pdf.
(Continued)

*Primary Examiner* — Jennifer Doan
(74) *Attorney, Agent, or Firm* — Wissing Miller LLP

(57) ABSTRACT

A connectivity appliance that can interconnect, optical fiber communication paths of one fiber density to optical fiber communication paths of a different density, for either breakout or aggregation functionality is provided. The connectivity appliance that can interconnect high density connectors, e.g., multi-fiber connectors, to a plurality of low density connectors, e.g., single fiber optic connectors. The connectivity appliance can determine the presence of connectors inserted into the connectivity appliance adapters, determine the characteristics of the cables and connectors inserted into the connectivity appliance and/or in close proximity to the connectivity appliance. Each connector on the connectivity appliances can have one or more associated indicators, e.g., LEDs, on either the front panel or the rear panel that is in close proximity to the relevant adapter and that provides visual indications associated with the connectors.

22 Claims, 25 Drawing Sheets

(51) Int. Cl.
G02B 6/44 (2006.01)
H04L 12/24 (2006.01)

(52) U.S. Cl.
CPC ......... *G02B 6/4452* (2013.01); *G02B 6/4472* (2013.01); *H04L 41/0806* (2013.01)

(56) References Cited

U.S. PATENT DOCUMENTS

| | | | |
|---|---|---|---|
| 2010/0166377 A1* | 7/2010 | Nair | G02B 6/4452 385/135 |
| 2010/0210135 A1 | 8/2010 | German et al. | |
| 2011/0008996 A1 | 1/2011 | Pinn et al. | |
| 2012/0246351 A1 | 9/2012 | Sybesma et al. | |
| 2016/0192044 A1 | 6/2016 | Raza et al. | |

OTHER PUBLICATIONS

International Search Report and Written Opinion mailed in corresponding PCT/US18/21399 dated May 11, 2018.
International Preliminary Report on Patentability mailed in PCT/US2018/021399 dated Sep. 10, 2019.

* cited by examiner

LCD SCREEN DISPLAY WHEN CONNECTIVITY
APPLIANCE IS IN OPERATION MODE

OPEN WORK ORDERS OR I/F WITH OPERATION CENTER

CONNECTIVITY APPLIANCE

CROSS REFERENCE TO RELATED APPLICATIONS

The present disclosure is based on and claims benefit from U.S. Provisional Application Ser. No. 62/468,252 filed Mar. 7, 2017 entitled "Connectivity Appliance" the entire contents of which are incorporated herein by reference.

BACKGROUND

Field

The present disclosure relates generally to data center network devices and more particularly to data center connectivity appliances with intelligent fiber and copper port management systems that simplify the installation of such connectivity appliances within a data center and that simplify the connection of fiber or copper cables to such connectivity appliances.

SUMMARY

The connectivity appliance according to the present disclosure may have a modular chassis or housing that enables users to install different types of connectivity modules therein. The connectivity appliance is also able to house a management module which contains a controller and user interface module that includes a display, e.g., an LCD screen or a touch screen display. The connectivity appliance has physical layer intelligence or per cable intelligence using known media reading interfaces and an RFID reader. Such physical layer intelligence and per cable intelligence is associated with the display for technician viewing. Cables may be able to be identified based on unique identifiers, including EPROM chips on connectors or cables, or RFID, or NFC type of technology. The display is used for example with cable identification functions to work as a system that permits technicians to set up and configure the connectivity appliances of the present disclosure.

In exemplary embodiments, the connectivity appliance housing can be built in modularity so that the connectivity appliance can include one or more patch panel modules and a management module with management hardware and embedded software, or the connectivity appliance may include all patch panel modules with a scaled down management module. The front panel of the housing may include a display, e.g., an LCD screen, to assist users during operations. The connectivity appliance with a display can run in standalone modes where the management module controls the operation of the connectivity appliance or under the control of a network management system software or middleware. The connectivity appliance according to the present disclosure in standalone mode or under the control of a network management system orchestration software or middleware, can be configured with hardware and software that can detect cable presence per port, and on a per port basis also gather information, such as cable part number, serial number and other physical information, provided directly from managed cables. In another exemplary embodiment, the connectivity appliance in standalone mode or under the control of a network management system orchestration software or middleware, can be configured with hardware and embedded software that can detect cable presence per port, and on a per port basis also gather information provided directly from the managed cables, and using an RFID reader and antenna enable the connectivity appliance to use RFID technology to read information from RFID tags attached to cables and ports. In another exemplary embodiment, the connectivity appliance in standalone mode or under the control of a network management system software or middleware, can be configured with hardware and embedded software that can detect cable presence per port, and on a per port basis also gather information provided directly from the managed cables, and using an RFID reader and antenna enable the connectivity appliance to use RFID technology to read information from RFID tags attached to cables, and the network management system software and connectivity appliance can together as a system discover the hardware within the connectivity appliance and attached cables so that the network management system software can then construct a graphical representation of the connectivity of the physical layer of a network which may be represented by a plurality of connectivity appliances connected to the network management system.

The connectivity appliances according to the present disclosure can interconnect, optical fiber communication paths of one density to optical fiber communication paths of a different density, for either breakout or aggregation functionality, or for optical fiber communication paths of one density to cross connect to optical fiber communication paths of the same density in a cross connect or "shuffle" arrangement. For example, devices with one or more Quad Small Form-factor Pluggable (QSFP+) multi-fiber transceivers that interface with multi-fiber connectors can be interconnected to devices with a plurality of small form factor (SFF) transceivers that interface with single fiber optic connectors. Non-limiting examples of multi-fiber connectors include Multi-fiber Push On connectors ("MPO connectors"), and non-limiting examples of single fiber optic connectors include Lucent Connectors ("LC"), FC, SC, or ST connectors.

The connectivity appliances according to the present disclosure can also interconnect, copper communication paths of one copper connector to a separate copper connection or connector. For example, a copper cable connected to a punch-down connection point could be interconnected to an RJ-45 jack.

In an example where QSFP+ multi-fiber connections are to be interconnected to LC duplex fiber connections, where each QSFP+ transceiver has 4 transmit (Tx) and 4 receive (Rx) fiber paths housed inside a 12 fiber MPO connector that are accessible from, for example, a front panel of the connectivity appliance. It should be noted that in this example, the remaining 4 fibers are inactive. In this exemplary embodiment, the connectivity appliance internally provides breakout connectivity from the multi-fiber connections to the individual fiber connectors. The result in this example is that 12 MPO connectors on a rear panel of the connectivity appliances can be interconnected to 96 LC connectors on the front panel of the connectivity appliance with 48 paired ports.

In another exemplary embodiment, a high density multi-fiber connection such as a 24 fiber MPO connector may break out the individual fibers to single fiber connectors such as bidirectional LC connections or into duplex LC connections supporting a transmit fiber and a receive fiber.

In another exemplary embodiment, a high density multi-fiber connection such as a 24 fiber MPO connector may break out the individual fibers to multifiber connectors, such as 12 fiber MPO connectors or 8 fiber MPO connectors, which may connect to downstream devices with multifiber port connectors such as 12 fiber MPO connectors or other transceiver interfaces, such as QSFP transceivers.

In addition, each fiber adapter on the connectivity appliances, e.g., each MPO or LC adapter, has one or more associated LEDs on either the front panel or the rear panel that is in close proximity to the relevant fiber adapter and that provides visual indications associated with the port. The operation of the LEDs, e.g., LED color, on, off, flashing, and flashing rate, may be programed by an externally attached device, by an external network management system, or by any other criteria defined by a controller within the connectivity appliance. In the exemplary embodiments shown, the one or more LEDs can be positioned above or below the fiber adapter. For example, each single fiber connector on the connectivity appliance, e.g., each quad LC adapter, may have one or more (e.g., two) LEDs on either the front panel or the rear panel that is in close proximity to the relevant single-fiber adapter. The LEDs provide a visual indication associated with the port. The one or more LEDs can have different colors to indicate defined conditions.

As another example, when interconnecting, one copper connector to another, e.g., from one RJ-45 jack to another RJ-45 jack, the one or more LEDs can be on the front or rear panel in close proximity to the RJ45 adapters.

In addition, the management modules and patch panel modules according to the present disclosure can be configurable sub-units, that can be configured with different functionality for the desired control and interconnect functions as described herein.

In addition, the connectivity appliance can be equipped with chip on connector (e.g., an EEPROM on a connector), near field communication (NFC) and/or RFID capabilities in order to obtain information about the cables connected to the connectivity appliance and to automatically verify that cables are connected to the proper ports in the connectivity appliance.

DETAILED DESCRIPTION

Figure 1:
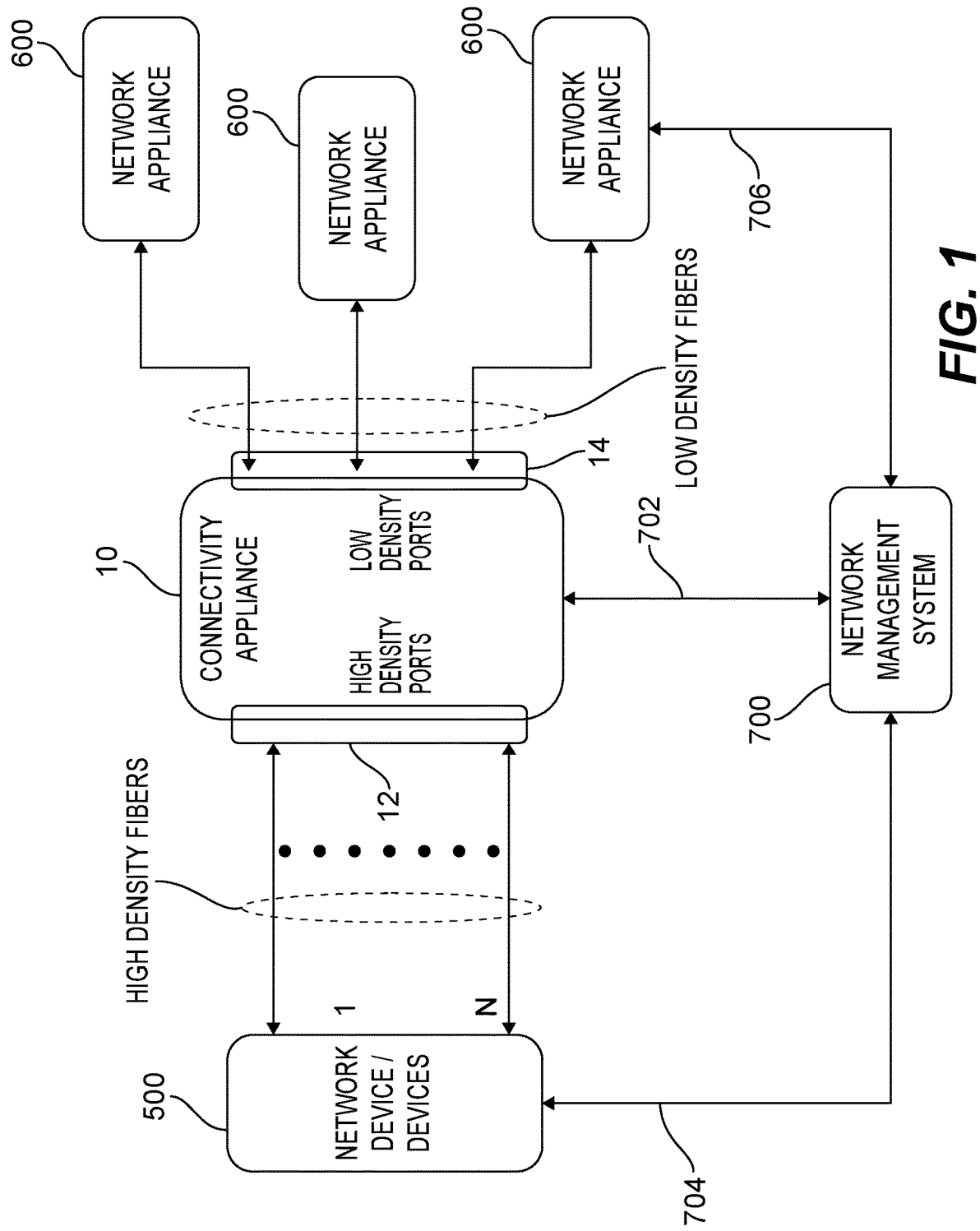
FIG. 1 is a block diagram of an exemplary embodiment of a data center network incorporating the connectivity appliance according to the present disclosure.

The present disclosure provides embodiments of data center type managed connectivity appliances or devices that incorporate an intelligent fiber or copper port management system that simplifies the installation of such managed connectivity appliances within a data center and that simplifies the connection of fiber optic or copper cables to such managed connectivity appliances. For ease of description, the managed connectivity appliances according to the present disclosure may also be referred to herein as the "connectivity appliances" in the plural and the "connectivity appliance" in the singular. Further, the fiber/copper management module incorporated into the connectivity appliance may also be referred to herein as the "management module." Further, high density ports or connectors and low-density ports and connectors are described herein in a comparative sense, where high density ports or connectors are ports or connectors whose fiber density is greater than ports or connectors referenced as low-density ports or connectors. To illustrate, high density ports or connectors could be ports or connectors with multiple fibers and low-density ports or connectors could be ports or connectors with a single fiber. As another illustration, when comparing a 24-fiber port or connector to a 12-fiber port or connector, the 24-fiber port or connector could be the high-density port and the 12-fiber port or connector could be the low fiber port or connector. Further, high density ports or connectors and low-density ports and connectors are described herein are for illustrating purposes, some application will be for cross connect applications where a high-density port on the rear panel may connect to the same high-density port size on the front panel. Similarly, another application is for cross connect applications where low-density ports on the rear panel may connect to the same low-density port size on the front panel. Further, the present disclosure contemplates embodiments where all ports (high-density and low-density ports) are to be mounted on the front panel of the connectivity appliance so that the connectivity appliance can be mounted within a rack with the rear panel flush to a rear wall of the rack. In these embodiments, some ports on the front panel interconnect to other ports also on the front panel.

The connectivity appliance according to the present disclosure can interconnect, optical fiber communication paths of one port density, e.g., high density fiber communication paths, to optical fiber communication paths of a different port density, e.g., low density fiber communication paths. In addition, the connectivity appliance can cross connect optical fiber communication paths of one port density to optical fiber communication paths of the same port density. In addition, the connectivity appliance can interconnect one copper connection to another copper connection. In the various embodiments of the connectivity appliance of the present disclosure, the connectivity appliance can provide human perceivable indications, e.g., visual or audible indications, that represent that status of network devices or network appliances connected to each port within the connectivity appliance and/or provide human perceivable indications that represent that fiber or copper cabling is properly connected to the connectivity appliance. Non-limiting examples of human perceivable indications include, illuminating one or more LEDs, displaying information on a display or providing audible sounds or messages.

As non-limiting examples, the management module within the connectivity appliance has an auto-configure process that permits untrained or modestly trained personnel to install the connectivity appliance within a rack and to start-up the connectivity appliance to a point where it is operational. The management module is also capable of guiding untrained or modestly trained personnel through work orders so that fiber optic or copper cables can be connected to the proper ports in the connectivity appliance and to verify that the connections made are proper connections. In other words, the management module within the connectivity appliance can manage fiber optic and copper cable installation, moves, adds or other changes so that untrained or modestly trained personnel can be used to manage the connectivity appliance. Other functions of the management module within the connectivity appliance may include the use of fiber optic or copper connectors that have a media reading interface (e.g., a chip on connector interface) so that the management module can detect the presence of a fiber optic or copper cable in a fiber optic or copper connector in the connectivity appliance. The connectivity appliance may include a conventional RFID tag reader so that the management module has the ability to read RFID tags on cables and retrieve and store media information about the cable. The management module can also compare stored data about each cable connected to a port within the connectivity appliance with currently read data so as to confirm that logged moves, adds and changes for cable insertions and extractions are accurate. The management module may also store identifying data and cable characteristics, such as for example, cable color, cable length, cable ID, cable fiber type, etc. The connectivity appliance may also store static or dynamic media data or other data on the chip (e.g., EEPROM) on the cable connector connected to the connectivity appliance.

Referring to FIG. 1, a block diagram of an exemplary embodiment of a connectivity appliance according to the present disclosure connected to one or more network devices 500, to one or more network appliances 600, and/or to a network management system (NMS) 700 is shown. For the purpose of the present disclosure, a network device can include network switches, patch panels and other types of devices facilitating data center or network communications. For the purpose of the present disclosure, a network appliance can include data storage devices, servers and other computing devices that facilitate user interaction. For the purpose of the present disclosure, a network management system includes systems that orchestrate or manage one or more operations of such network devices and/or network appliances. A non-limiting example of a network management system is the AllPath® Director ("APD") orchestration system developed, marketed and sold by Fiber Mountain, Inc. The connectivity appliance 10, network devices 500 and network appliances 600 communicate with the network management system (NMS) 700 via communication paths 702, 704 and 706 respectively.

As noted, the connectivity appliance 10 can be used, for example, to interconnect optical fiber paths of one or more ports of, for example, a network device 500 having one fiber density to optical fiber paths having a different fiber density that can be used by the one or more network appliances 600 or other network devices As a non-limiting example and referring to FIG. 1, the connectivity appliance 10 according to the present disclosure can include a high density side 12 with one or more high density multi-fiber ports and a low density side 14 with one or more single or low density multi-fiber ports. The high-density side 12 can be connected to one or more multi-fiber ports of for example a network device 500 while the low-density side 14 can be connected to one or more network appliances 600. In this example, the network device 500 is a network switch having one or more ports that can include a Quad Small Form-factor Pluggable (QSFP+) multi-fiber transceivers that interface with multi-fiber connectors, and the network appliances 600 are servers with one or more ports that include small form factor (SFF) transceivers that interface with single fiber connectors. Using the connectivity appliance 10, the high-density communication paths on the network device 500 can be interconnected, to a plurality of low density communication paths connected to a plurality of network appliances 600. Examples of multi-fiber connectors may include Multi-fiber Push On ("MPO") connectors, MXC connectors, or other connectors capable of trunking more than one fiber in a single jacket. Examples of single fiber optic connectors may include Lucent ("LC") connectors, SC connectors, FC/PC connectors, or other connector types that terminate single fiber cables.

Figure 5:
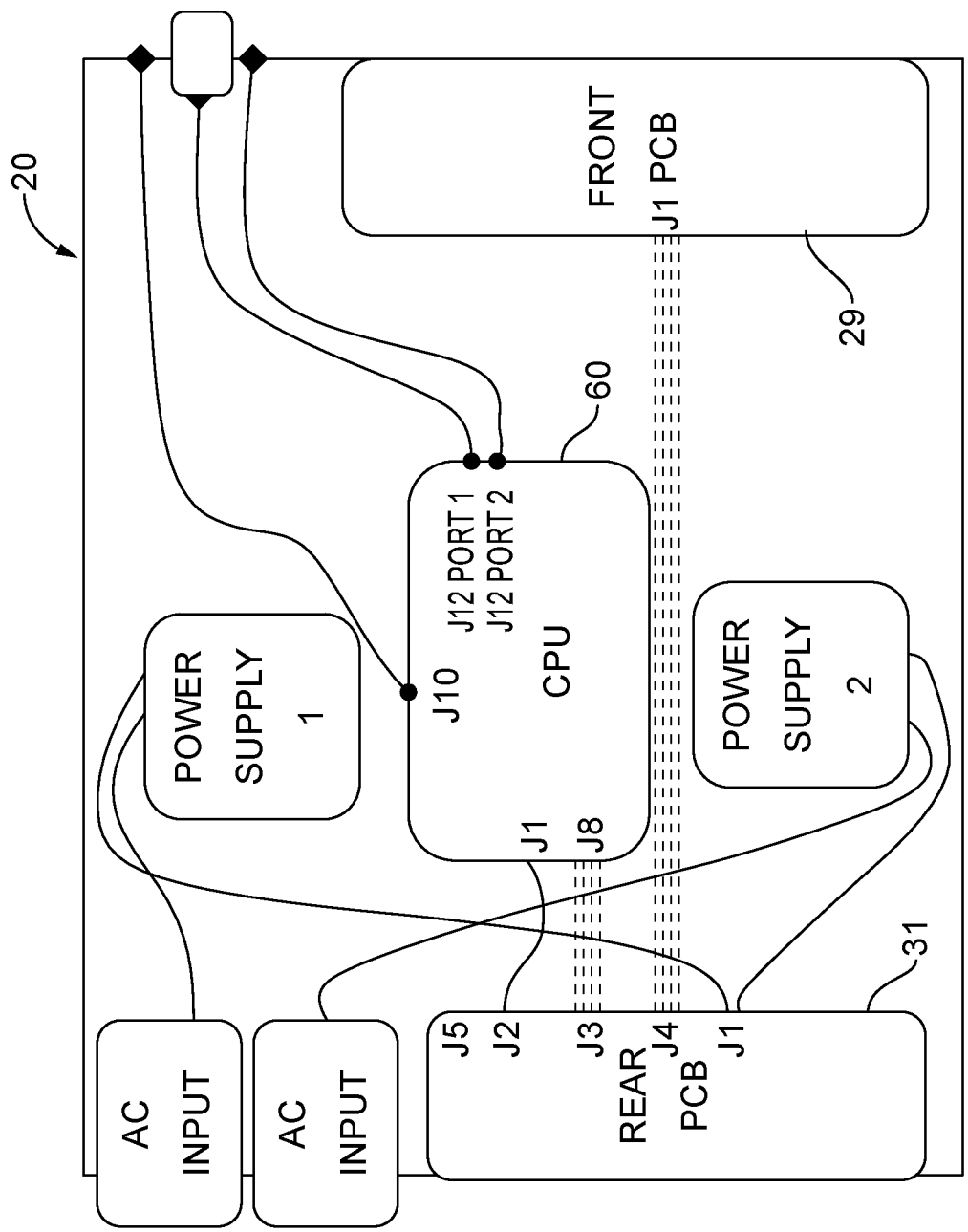
FIG. 5 is a functional block diagram of an exemplary embodiment of a controller included in the management module of the connectivity appliance according to the present disclosure.

Referring to FIGS. 2-6, an exemplary housing for the connectivity appliance 10 of the present disclosure is shown. The housing 20 includes, for example, a base 22, side walls 24 and 26, a front panel 28, a rear panel 30 and a cover 32. The front and rear panels 28 and 30 of the housing 20 include a printed circuit board (PCB) 29 and 31 secured thereto, as seen in FIG. 5. The front PCB 29 is mounted to an interior side of the front panel 28 and has electronic components to drive one or more LEDs associated with fiber optic adapters 34 on the front panel 28. The rear PCB 31 is mounted to an interior side of the rear panel 30 and has electronic components to drive one or more LEDs associated with fiber optic adapters 36 on the rear panel 30. The LEDs on the front and/or rear PCBs 29 and 31 project through holes in the front panel 28 and the rear panel 30 so that they are easily visible from an exterior of the connectivity appliance 10 as described below. Within the connectivity appliance 10 is a management module 50 and one or more patch panel modules 80, seen in FIG. 4. The management module 50 is in communication with the external network management system 700 via the bi-directional communication path 702, seen in FIG. 1.

Referring to FIGS. 3-6, another exemplary embodiment of a management module 50 according to the present disclosure is shown. In this exemplary embodiment, the management module may include, for example, a controller 52 and a user interface module 54. The controller 52 includes a management board 56, communication interface 58 and a CPU 60. The user interface module 54 may include a display device, such as a LCD, an RFID antenna, USB connectors and/or one or more LEDs on the front panel 28 or the rear panel 30.

Figure 6:
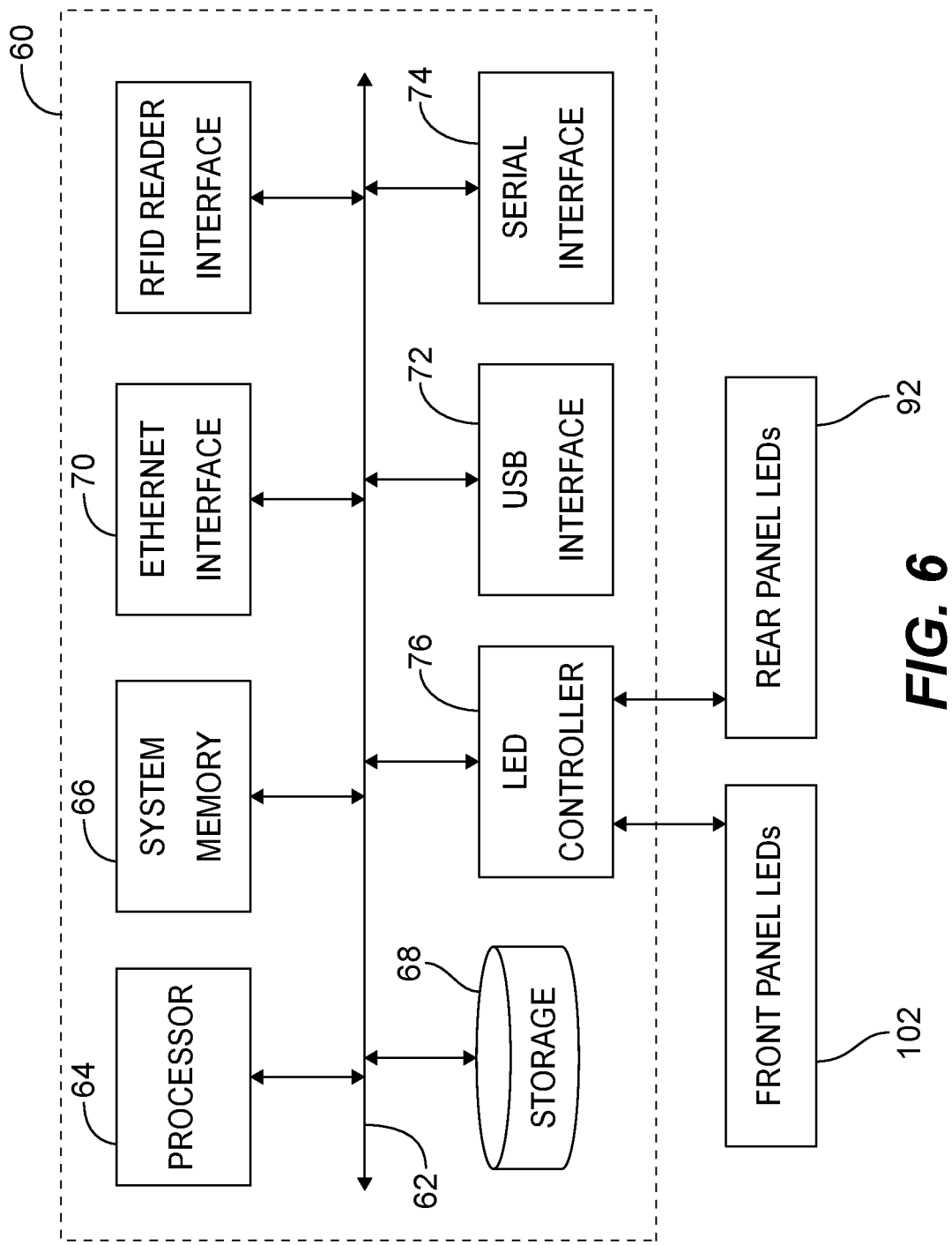
FIG. 6 is a functional block diagram of another exemplary embodiment of the controller included in the management module of the connectivity appliance according to the present disclosure.
Figure 7:
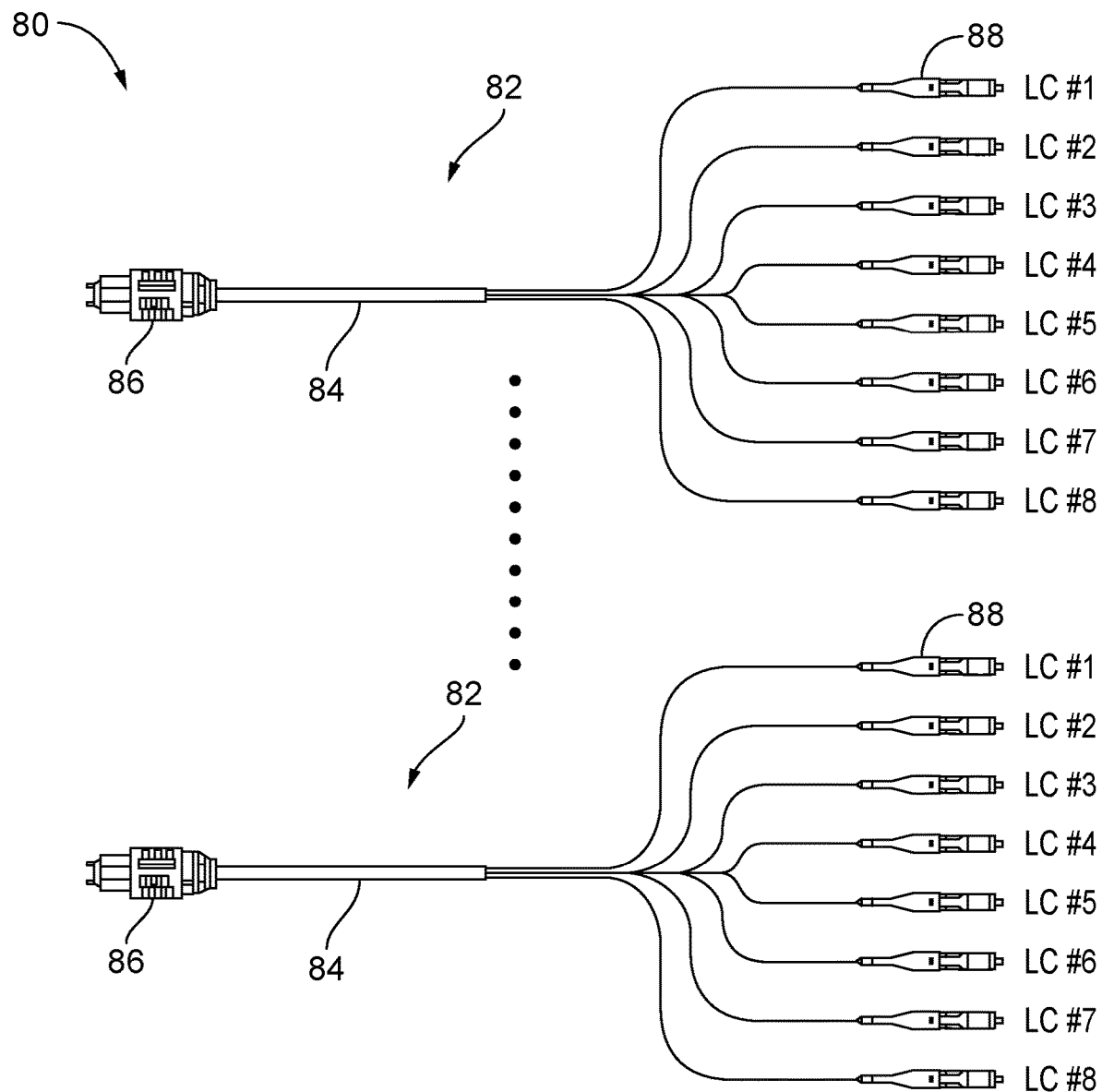
FIG. 7 is an exemplary embodiment of a hydra cable used in the connectivity appliance according to the present disclosure for connecting a high-density MPO connector to a plurality of low density LC connectors.

The management board 56 of the controller 52 includes, for example, known RFID reader circuitry, a I2C multiplexer for communication along an I2C serial bus, a media interface reader and other known foundation components of an appliance such as one or more power supplies for providing power to the management board 56 and the user interface module 54. An example of a media interface reader is a reader capable of reading EPROM chips on connectors or cables or NFC type of technology. The communication interface 58 includes known communication interfaces, such as Ethernet and/or USB communication interfaces. The Ethernet communication interface is connected to one or more Ethernet connector ports, such as RJ-45 Ethernet jacks on the front and/or rear panels 28 and 30 respectively. The USB communication interface is connected to one or more USB connectors on the front and/or rear panels. Referring to FIG. 6, a block diagram of an exemplary embodiment of the CPU 60 environment is shown. In this exemplary embodiment, the CPU 60 components are interconnected via a bus 62. The CPU 60 includes a processor 64 that executes software instructions or code stored on, for example, a computer readable storage medium, or stored in system memory 66, e.g., random access memory, or storage device 68, to perform the operations of the connectivity appliance 10. The storage device 68 provides storage space for retaining static data, such as program instructions that could be stored for later execution and media information about each fiber optic cable and connector connected to the connectivity appliance via the RFID reader and/or the media interface reader. Alternately, with in-memory computing devices or systems or in other instances, the system memory 66 would have sufficient storage capacity to store much if not all of the data and program instructions used for the connectivity appliance, instead of storing the data and program instructions in the storage device 68. The CPU also includes a UI controller 76.

The CPU 60 of the controller 52 controls the Ethernet interface 70, the USB interface 72 described above. The CPU 60 also controls the serial interface 74, such as an I2C interface described above. The User Interface (UI) controller 76 controls the operation of the LEDs on the front panel PCB 29 and/or the rear panel PCB 31 as well as the user interface module 54. The CPU 60 connects using ethernet port 70 and serial interface 74 to connectors on the front panel PCB 29 and/or the rear panel PCB 31. The communication path 702 can then be connected to ethernet port 70 and serial interface 74 to the CPU so that the connectivity appliance can communicate with the network management device 700. The CPU 60 also controls the operation of the connectivity appliance 10 and is coupled to the communication interfaces 58 and the management board 56.

It is noted that the external network management system 700 determines the behavior of the connectivity appliance's LEDs as described herein. For example, the network management system 700 can either query or receive an unsolicited event from the one or more network devices 500 via path 704, representing, for example, the port status of the one or more network devices, then maps the status to a pre-defined LED color and or blink pattern. The CPU 60 controls the operation of the LEDs in the connectivity appliance based on criteria defined by management module 50 within the connectivity appliance 10. Non-limiting examples of such criteria include blinking the LED red if the incorrect cable is plugged in, or blinking the LED green if the correct cable is plugged in.

Referring to FIGS. 4, 7, 9 and 10, one or more of the patch panel modules 80 contemplated herein could be replaceable modules such that a patching module could be removed from the connectivity appliance 10 and replaced with a different patching module. In such embodiments, the replaceable patch panel modules could be within a separate chassis or enclosure so that they are easily replaceable. In another exemplary embodiment, one or more of the patch panel modules 80 could be fixed within the connectivity appliance. In such embodiments, the fixed patch panel modules could be within a separate chassis or enclosure or they could be components included within the housing 20. The patch panel modules 80 include one or more fiber optic cable assemblies 82, one or more high-density adapter modules 90 and one or more low-density adapter modules 100. Non-limiting examples of fiber optic cable assemblies 82 include hydra cables, fanout cables, breakout cables and like cables that split multiple fibers connected to a high-density connector into individual fibers that are connected to low-density connectors or other equivalent sized density connectors. In the exemplary embodiment shown, the fiber optic cable assemblies 82 are hydra cables. In the exemplary embodiment, the hydra cable assemblies 82 have a high-density connector 86, e.g., a MPO connector, at one end, a plurality of low density connectors 88, e.g., LC connectors, at the other end and a hydra cable 84 between the connectors. The hydra cable 84 includes a branching boot that splits the multiple fibers connected to the high-density connector 86 into individual fibers that are connected to the low-density connectors 88. An exemplary MPO to LC hydra cable, seen in FIG. 7, splits or converts the fiber connections from the multi-fiber connectors 86 to the single fiber connectors 88. For example, the hydra cable can split a 4×10 Gbps QSFP transceiver to four duplex SFP transceivers. The QSFP transceiver, in this exemplary embodiment, is connected to the rear panel MPO connector by a 12 fiber MPO cable with MPO connectors. The multi-fiber cable can mate to the rear panel MPO adapter 36 on the rear panel 30 of the housing 20. The low-density side of the hydra cables is inserted into the LC adapters 34 on the front panel 28 of the housing 20.

Figure 3:
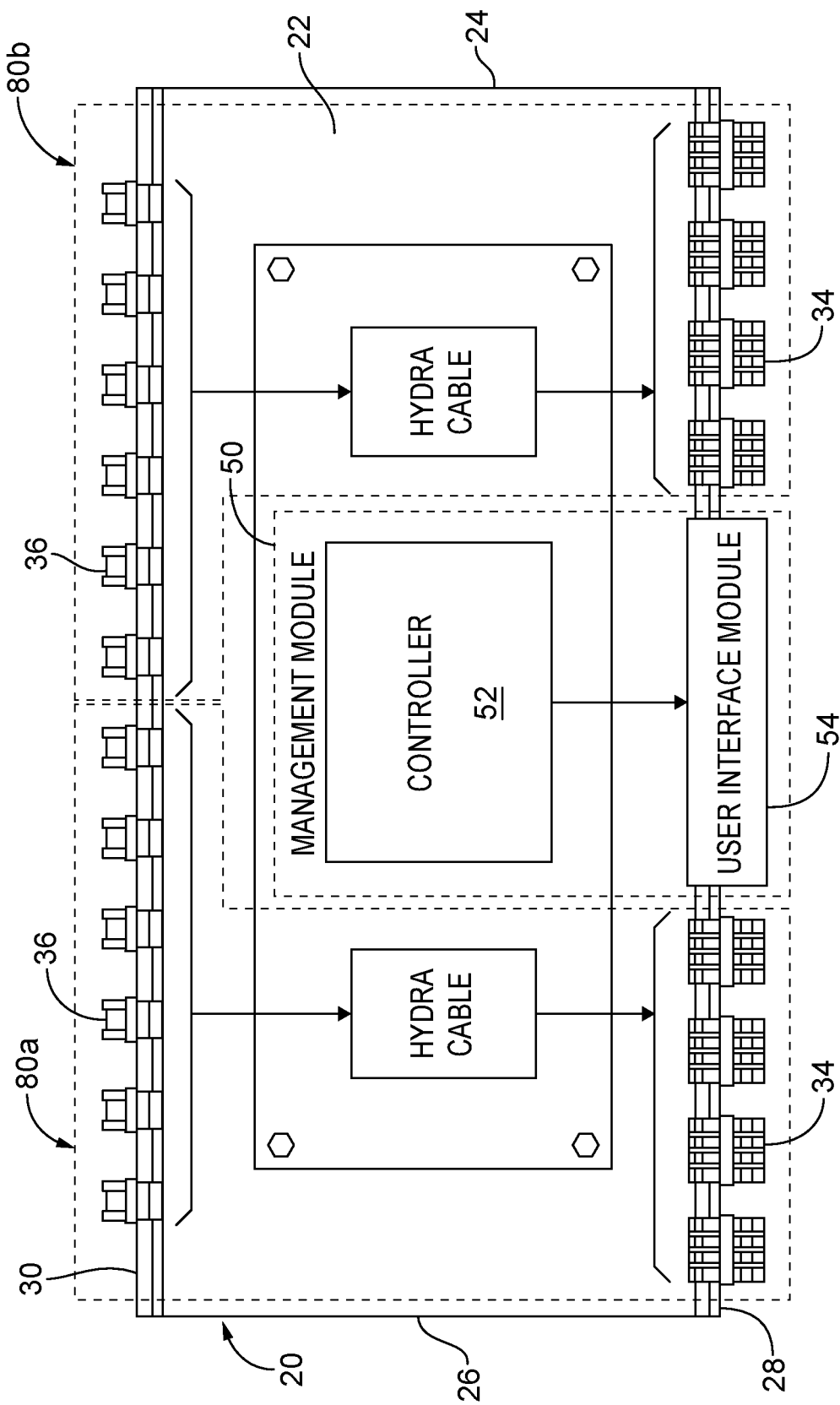
FIG. 3 is a top plan of an exemplary embodiment of the housing for the connectivity appliance according to the present disclosure with a cover removed.
Figure 4:
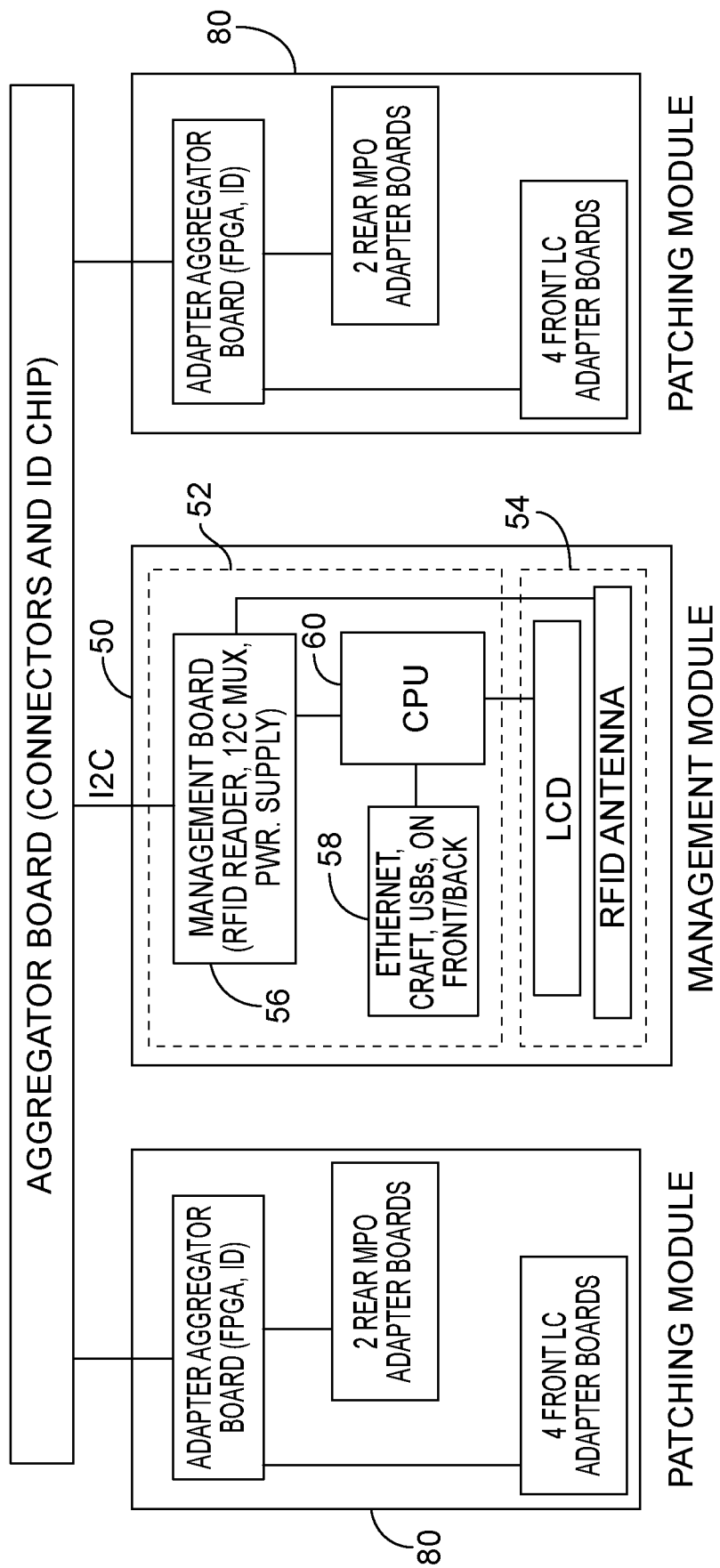
FIG. 4 is a functional block diagram of an exemplary embodiment of the connectivity appliance according to the present disclosure, illustrating a management module and multiple patch panel modules.
Figure 8:
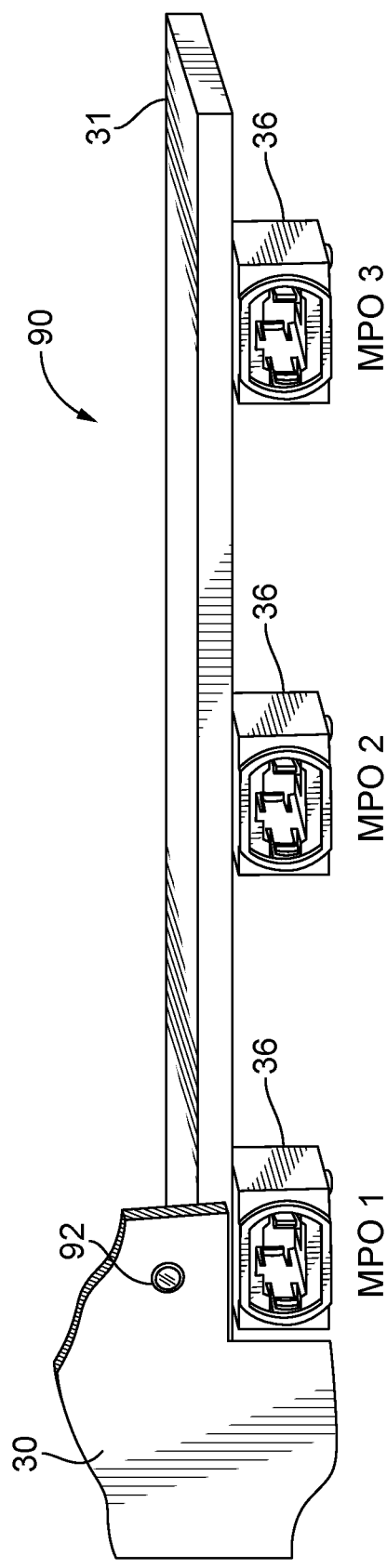
FIG. 8 is an exemplary embodiment of a high-density connector adapter module for a front or rear panel configuration in the connectivity appliance according to the present disclosure.

Referring to FIGS. 3 and 8, one or more high-density adapter modules 90 of the patch panel modules 80 may be secured to, for example, the rear panel 30 of the connectivity appliance 10. In the exemplary embodiment of FIG. 3, there are two groups of one or more high-density adapter modules 90 secured to the rear panel 30. A first group of one or more high-density adapter modules 90 may be secured to, for example, the rear panel 30 of the connectivity appliance 10 and is associated with patching module 80a, and a second group of one or more high-density adapter modules 90 may be secured to, for example, the rear panel 30 and is associated with patching module 80b. Each of the one or more high-density adapter modules 90 have one or more MPO panel mount adapters 36 in which MPO adapters 36 pass through openings on the rear PCB 31 and mount to, for example, the rear panel 30 of the housing 20. The MPO panel mount adapters 36 may or may not be operatively connected to the rear PCB 31 attached to the rear panel 30. In other embodiments, the MPO adapters 36 may be mounted to the rear PCB. The MPO adapters 36 in the embodiment of FIG. 8 are configured as a single row with three MPO adapters 36. In addition, each high-density adapter 36 has a port status LED 92 in close proximity to the high-density connector, as seen. In the exemplary embodiment of FIG. 8, the port status LEDs 92 are above the high-density adapter 36. It should be noted that one or more high-density adapter modules 90 may also be secured to the front panel 28 of the connectivity appliance 10.

Figure 9:
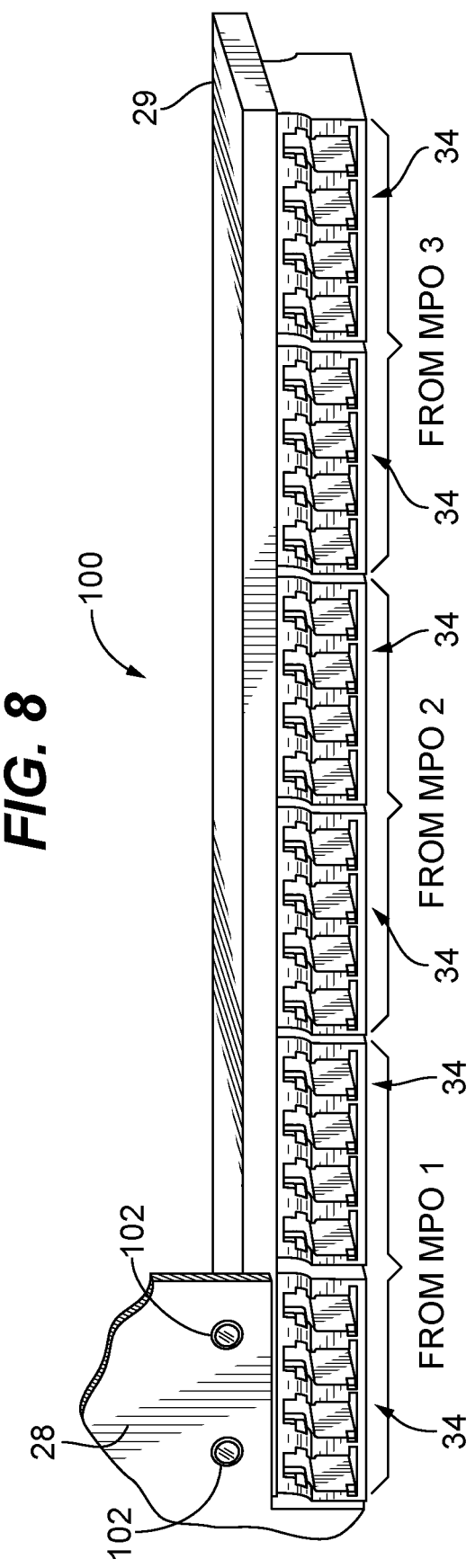
FIG. 9 is an exemplary embodiment of a low-density connector adapter module for a front or rear panel configuration in the connectivity appliance according to the present disclosure.
Figure 10:
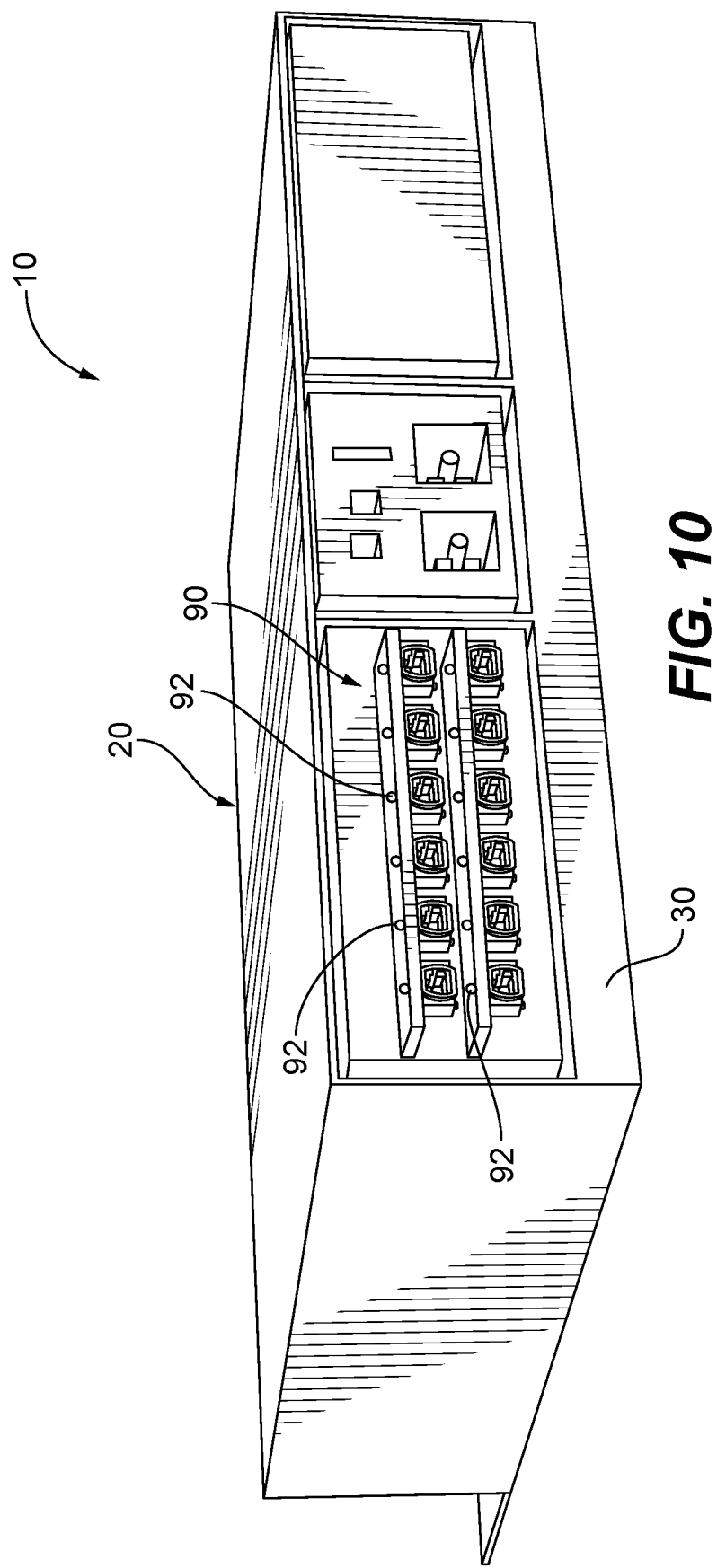
FIG. 10 is an exemplary embodiment of a rear panel configuration for the housing of the connectivity appliance according to the present disclosure.
Figure 11:
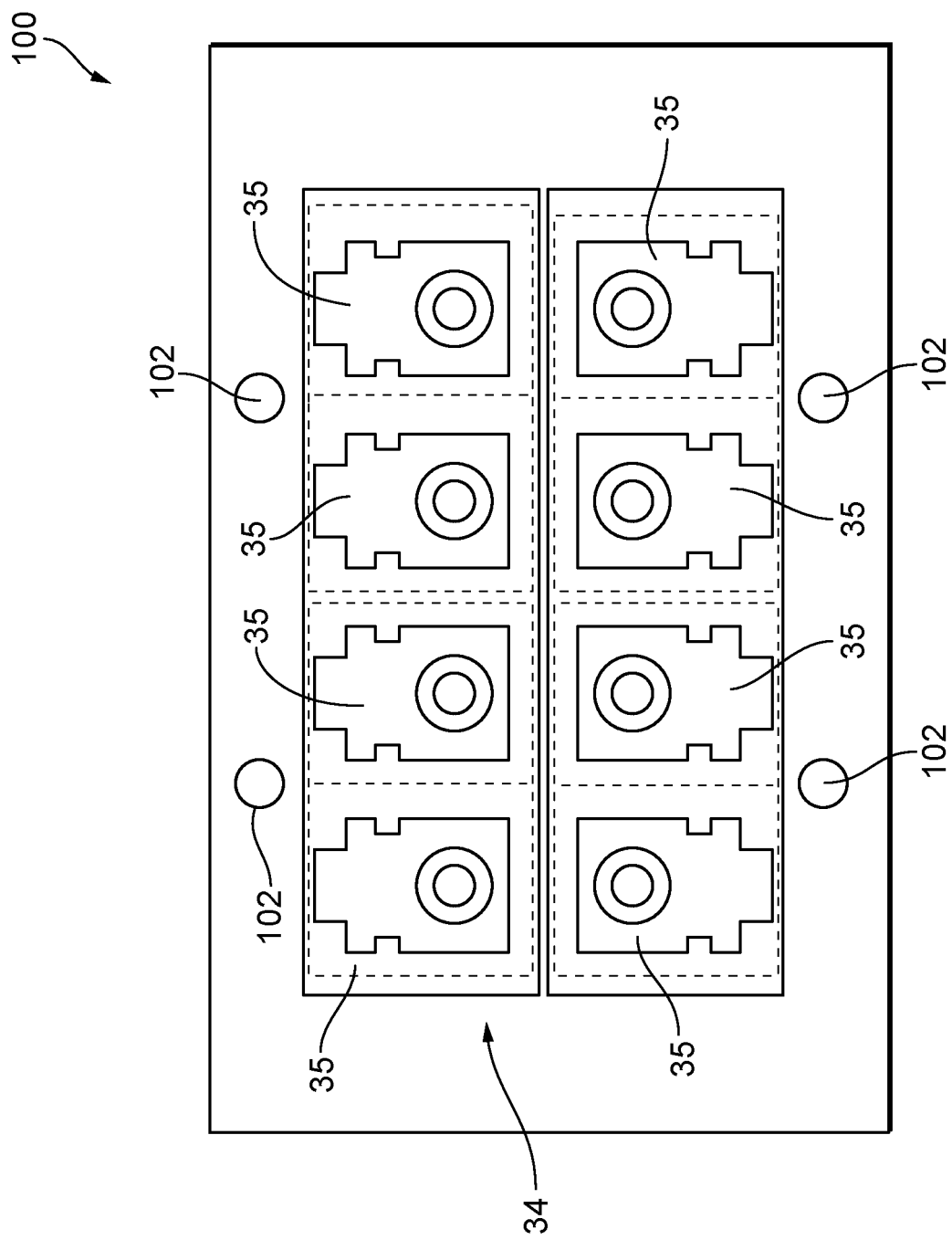
FIG. 11 is another exemplary embodiment of a low-density connector adapter module for a front or rear panel configuration in the connectivity appliance according to the present disclosure.

Referring to FIGS. 3, 9 and 11, one or more low-density adapter modules 100 of the patch panel modules 80 may be secured to, for example, the front panel 28 of the connectivity appliance 10. In the exemplary embodiment of FIG. 3, there are two groups of one or more low-density adapter modules 100 secured to the front panel 28. A first group of one or more low-density adapter modules 100 may be secured to, for example, the front panel 28 of the connectivity appliance 10 and is associated with patching module 80a, and a second group of one or more low-density adapter modules 100 may be secured to, for example, the front panel 28 and is associated with patching module 80b. Each of the one or more low-density adapter modules 100 have one or more LC panel mount adapters 34 in which LC adapters 34 pass through openings on the front PCB 29 and mount to, for example, the front panel 28 of the housing 20. The LC adapters 34 may or may not be operatively connected to the front PCB 29 attached to the front panel 28. In other embodiments, the LC adapters 34 may be mounted to the front PCB. The LC adapters 34 in this embodiment are configured as a single row of LC connector groups of two quad LC adapters 34, as shown in FIG. 9. In addition, each low-density adapter 34 pair has port status LEDs 102 in close proximity to the low-density adapters 34, as seen. In the exemplary embodiment of FIG. 9, the port status LEDs 102 are above the low-density connector pairs. In the exemplary embodiment of FIG. 11, the LC adapters 34 are configured as two rows of quad LC connector groups in a stacked arrangement. Each low-density adapter 34 pair has port status LEDs 102 in close proximity to the low-density adapters 34, as seen. In the exemplary embodiment of FIG. 11, the port status LEDs 102 in the upper row are above the low-density connector pairs and the port status LEDs 102 in the lower row are below the low-density connector pairs. It should be noted that one or more low-density adapter modules 100 may also be secured to the rear panel 30 of the connectivity appliance 10.

Figure 12A:
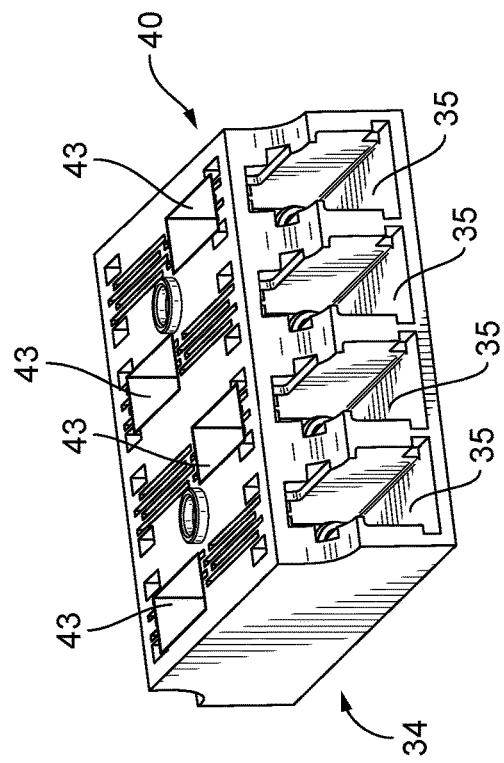
FIG. 12a is an exemplary embodiment of quad low-density connector adapter used with the connectivity appliance according to the present disclosure, illustrating one or more media reading interfaces associated with each connector in the connector adapter used to determine the presence or absence of a fiber optic cable within the adapter.
Figure 12B:
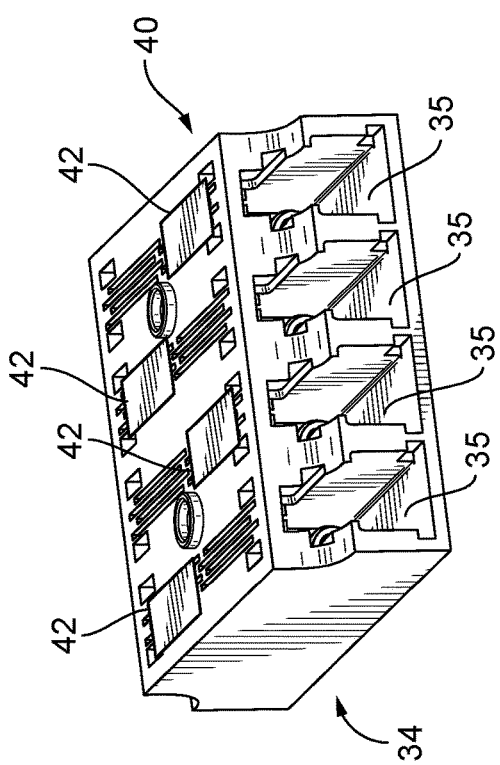
FIG. 12b is another exemplary embodiment of quad low-density connector used with the connectivity appliance according to the present disclosure, illustrating one or more openings associated with each connector in the connector adapter used to permit sensors to determine the presence or absence of a fiber optic cable within the adapter.

Referring to FIG. 12a an exemplary embodiment of a low-density adapter 40, such as a LC adapter, that can be used in the low-density adapter modules 100 is shown. In this exemplary embodiment, the low-density adapter 40 has four connector openings 35, e.g., LC connector openings, which is also known as a quad adapter. Each connector opening 35 has a media reading interface 42 that is in close proximity to and aligned with the connector opening 35 so that when a low-density connector, e.g., an LC connector 88, is inserted into the connector opening 35 the media reading interface 42 can read a corresponding media reading interface on the cable connector inserted into the connector opening 35. The media reading interface 42 allows the management module 50 to determine the presence of the cable connector in the connector opening 35 and to read media information stored on the media reading interface of the cable connector, such as reading the cable type and end-point connection of the cable. Non-limiting examples of media reading interfaces 42 include a chip on the adapter, such as an EEPROM). Referring to FIG. 12b, another exemplary embodiment of a low-density adapter 40, such as a LC adapter, that can be used in the low-density adapter modules 100 is shown. In this exemplary embodiment, the low-density adapter 40 has four connector openings 35, e.g., LC connector openings, which is also known as a quad adapter. Each connector opening 35 has a cutout or opening 43 aligned over the connector opening 35 so that when a low-density connector, e.g., an LC connector 88, is inserted into the connector opening 35 an infrared or light beam from a conventional infrared or light source can pass through the opening 43 into the connector opening 35 and be reflected back through the opening 43 to a conventional infrared or light sensor (not shown) positioned above the opening 43. The infrared or light sensor allows the management module 50 to determine the presence of the low-density cable connector, e.g., an LC connector 88, within the connector opening 35.

Figure 13A:
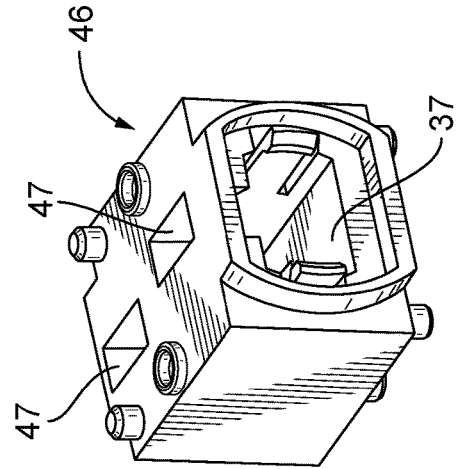
FIG. 13a is an exemplary embodiment of a high-density connector adapter used with the connectivity appliance according to the present disclosure, illustrating one or more media reading interfaces associated with each connector in the connector adapter used to determine the presence or absence of a fiber optic cable within the adapter.
Figure 13B:
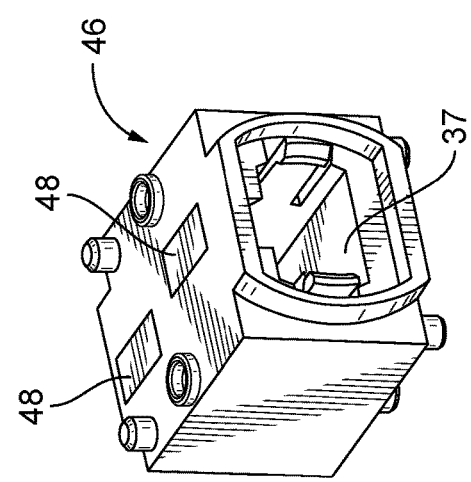
FIG. 13b is an exemplary embodiment of a high-density connector adapter used with the connectivity appliance according to the present disclosure, illustrating one or more openings associated with each connector with each connector in the connector adapter used to determine the presence or absence of a fiber optic cable within the adapter.

Referring to FIG. 13a an exemplary embodiment of a high-density adapter 46, such as a MPO adapter, that can be used in the high-density adapter modules 90 is shown. In this exemplary embodiment, the high-density adapter 46 has a connector opening 37 and one or more media reading interfaces 48 that is in close proximity to and aligned with the connector opening 37 so that when a high-density cable connector, e.g., an MPO cable connector 86, is inserted into the connector opening 37 the media reading interface 48 can read a corresponding media reading interface on the cable connector inserted into the connector opening 37. The media reading interface 48 allows the management module 50 to determine the presence of the cable connector the connector opening 37 and to read media information stored on the media reading interface of the cable connector, such as reading the cable type and end-point connection of the cable. Referring to FIG. 13b, another exemplary embodiment of a high-density adapter 46, such as a MPO adapter, that can be used in the high-density adapter modules 90 is shown. In this exemplary embodiment, the high-density adapter 46 has a connector opening 37 and a cutout or opening 47 positioned over one or both ends of the high-density adapter 46. The opening 47 is aligned with the connector opening 37 so that when a high-density connector, e.g., an MPO connector 86, is inserted into the connector opening 37 an infrared or light beam from a conventional infrared or light source can pass through the opening 47 into the connector opening 37 and be reflected back through the opening 43 to a conventional infrared or light sensor (not shown) positioned above the opening 47. The infrared or light sensor allows the management module 50 to determine the presence of the high-density cable connector, e.g., an MPO connector, within the connector opening 37.

Another exemplary embodiment of a low-density adapter 40, that can be used in the low-density adapter modules 100 is described. In this exemplary embodiment, the low-density connector is a conventional RJ-45 connector or jack (not shown). Each RJ-45 connector can have a RJ-45 connector opening for receiving a copper cable connector and a media reading interface, which is similar to the media reading interfaces noted above. The media reading interface is positioned in close proximity to and aligned with the RJ-45 connector opening so that when a copper cable connector of a copper cable is inserted into the RJ-45 connector the media reading interface can read a corresponding media reading interface on the copper cable connector inserted into the RJ-45 connector. The media reading interface allows the management module 50 to determine the presence of the copper cable connector in the RJ-45 connector opening and to read media information stored on the media reading interface (e.g., the EEPROM) of the copper cable connector, such as reading the cable type and end-point connection of the copper cable. Another exemplary embodiment of a low-density adapter 40 incorporating a conventional RJ-45 connector or jack (not shown) into the low-density adapter modules 100 is described. In this exemplary embodiment, each RJ-45 connector has a cutout or opening aligned over the RJ-45 connector opening so that when a RJ-45 cable connector is inserted into the RJ-45 connector opening an infrared or light beam from a conventional infrared or light source can pass through the connector opening into the RJ-45 connector opening and be reflected back through the opening a conventional infrared or light sensor positioned above the opening. The infrared or light sensor allows the management module 50 to determine the presence of the RJ-45 cable connector in the RJ-45 connector opening.

Figure 2:
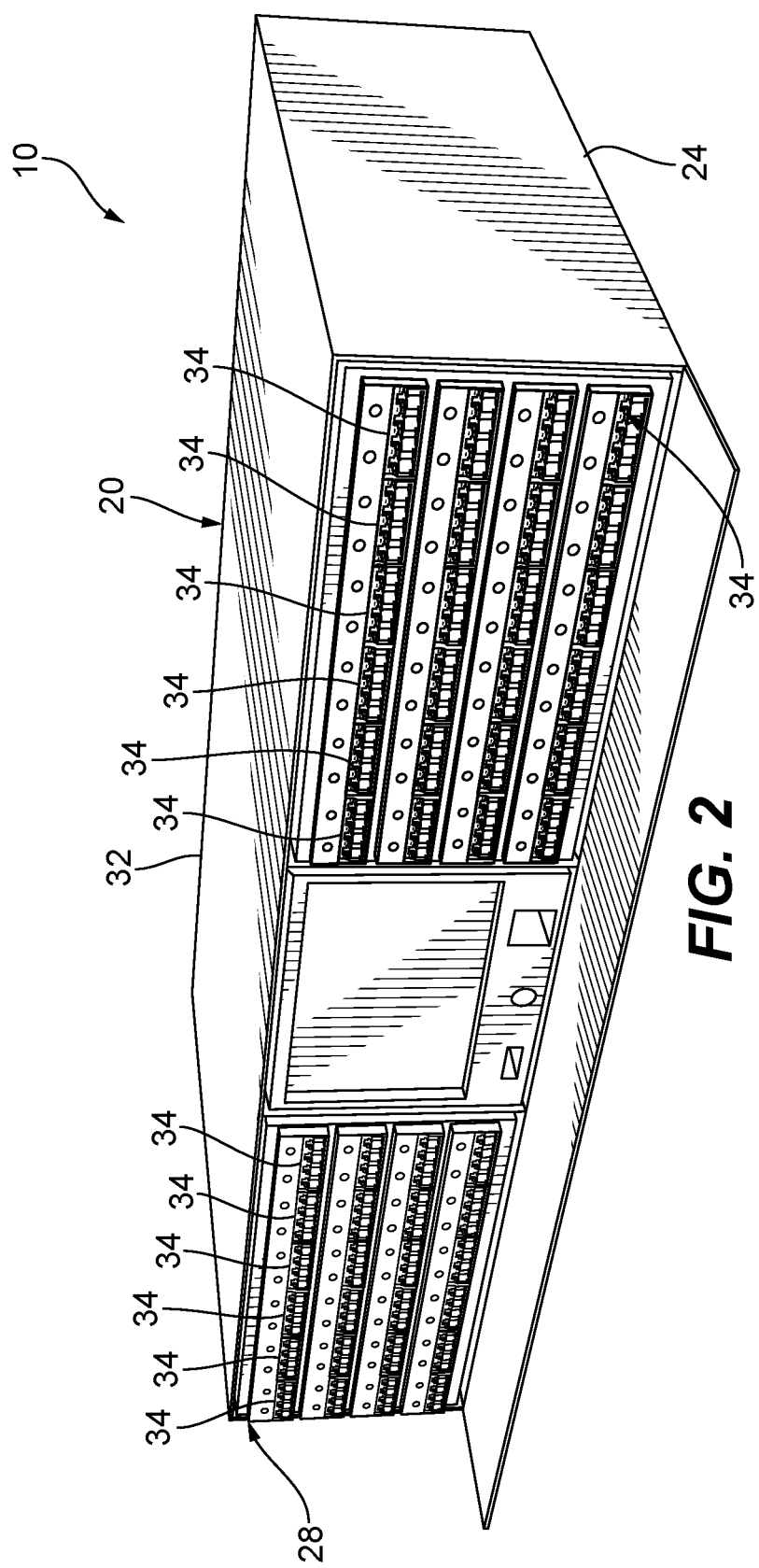
FIG. 2 is an exemplary embodiment the connectivity appliance according to the present disclosure, illustrating a front panel configuration of a housing having patch panel modules separated by a management console of a management module.

Referring now to FIGS. 2 and 14-16, exemplary embodiments of front panel 28 configurations for the connectivity appliance 10 according to the present disclosure are provided. In FIG. 2, the connectivity appliance has a 2RU housing 20 and the front panel 28 has two low-density adapter module groups (one group associated with patching module 80a and the other group associated with patching module 80b) separated by a user interface module 54 of the management module 50. The low-density adapter modules 100 in the first group includes two sets of stacked low-density adapter modules 100. Each stack has an upper row and a lower row and each row has 6 quad LC adapters 34. Each LC connector pair in each quad LC adapter 34 has LEDs 102 in close proximity as described above. Similarly, the low-density adapter modules 100 in the second group includes two sets of stacked low-density adapter modules 100. Each stack has an upper row and a lower row and each row has 6 quad LC adapters. Each LC connector pair in each quad LC adapter 34 has LEDs 102 in close proximity as described above. The user interface module 54 includes a 4-inch LCD display 150, a USB connector 152 for interfacing with USB compatible devices, a stylus opening 154 for storing a stylus for the display 150 and an SFP cage 156 for receiving a compatible transceiver.

Figure 14:
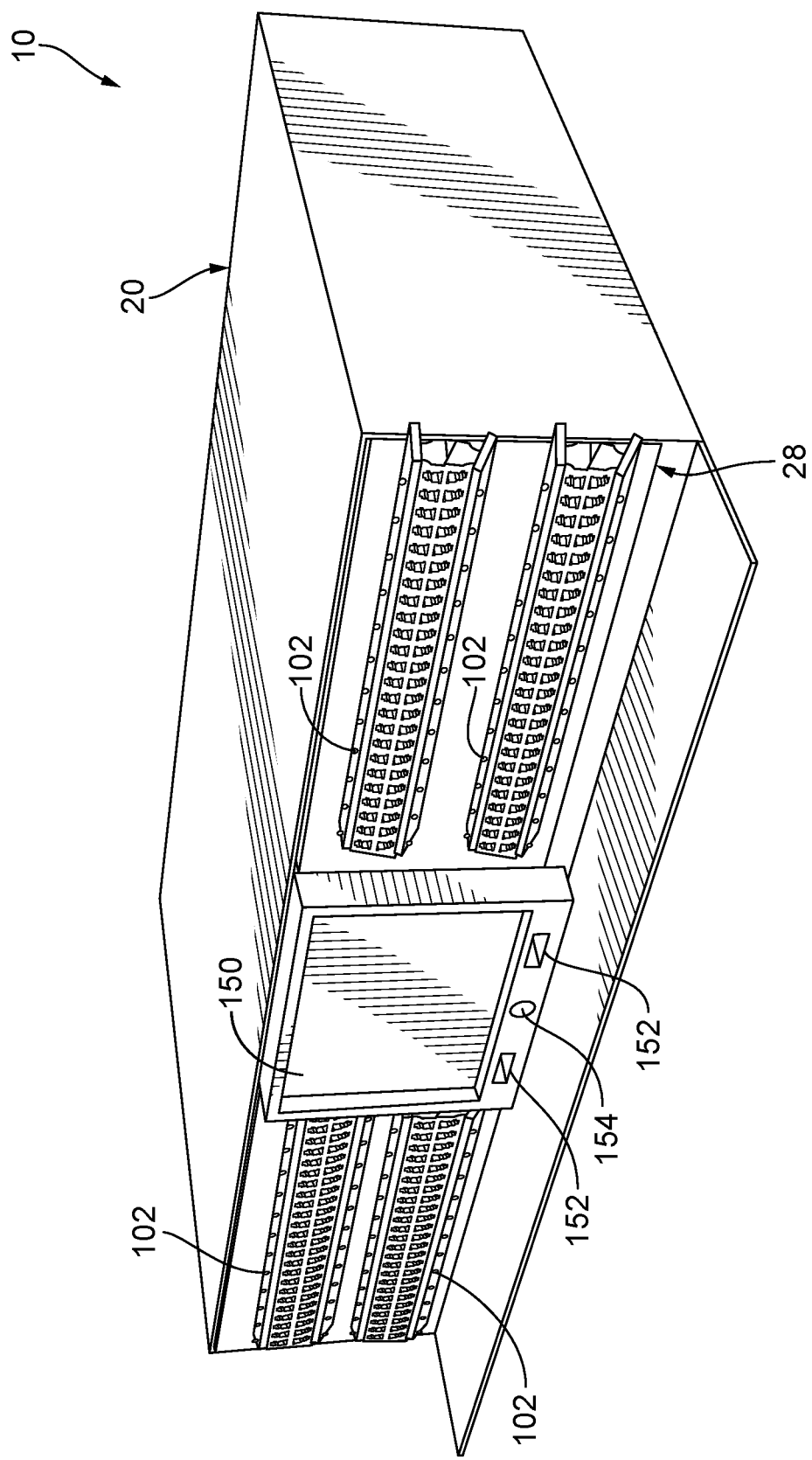
FIG. 14 is an exemplary embodiment of a front panel configuration for the housing of the connectivity appliance according to the present disclosure, illustrating patch panel modules separated by a management module.

In FIG. 14, the connectivity appliance has a 2RU housing 20 and the front panel 28 has two low-density adapter module groups (one group associated with patching module 80a and the other group associated with patching module 80b) separated by the user interface module 54 of the management module 50. The low-density adapter modules 100 in the first group includes two sets of stacked low-density adapter modules 100. Each stack has an upper row and a lower row and each row has 6 quad LC adapters 34. Each LC connector pair in each quad LC adapter 34 has LEDs 102 in close proximity as described above. Similarly, the low-density adapter modules 100 in the second group includes two sets of stacked low-density adapter modules 100. Each stack has an upper row and a lower row and each row has 6 quad LC adapters. Each LC connector pair in each quad LC adapter 34 has LEDs 102 in close proximity as described above. The user interface module 54 includes a 4-inch LCD display 150 that extends out from the front panel, two USB connectors 152 for interfacing with multiple USB compatible devices, and a stylus opening 154 for storing a stylus for the display.

Figure 15:
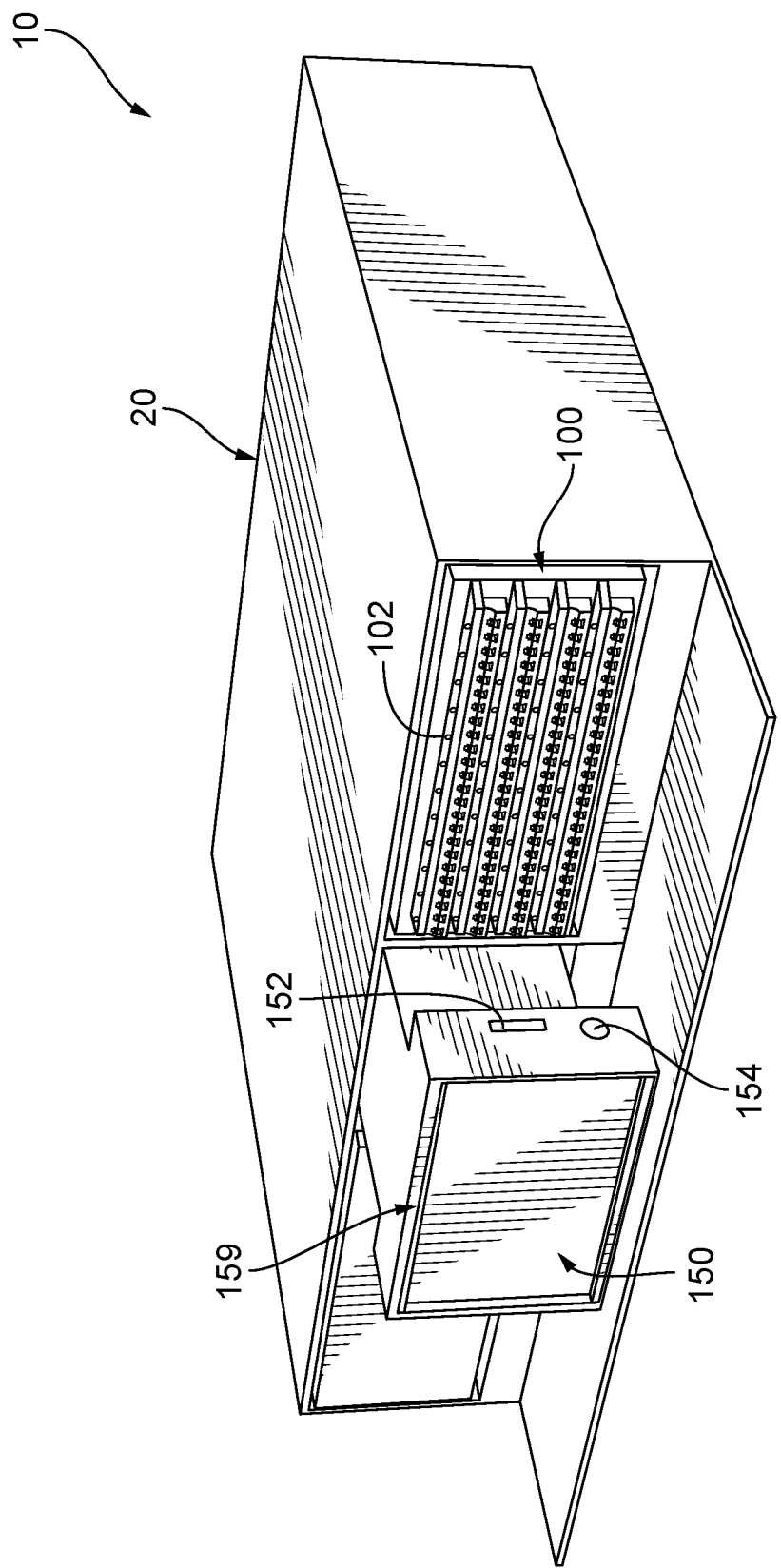
FIG. 15 is another exemplary embodiment of a front panel configuration for the housing of the connectivity appliance according to the present disclosure, illustrating a patch panel module on one side of the housing and a central management module.

In FIG. 15, the connectivity appliance has a 2RU housing 20 and the front panel 28 has one low-density adapter module group associated with patching module 80b and a user interface module 54 of the management module 50. The low-density adapter modules 100 in the group includes four stacked low-density adapter modules 100. The stack has an upper row, two intermediate rows and a lower row. Each row has 6 quad LC adapters 34. Each LC connector pair in each quad LC adapter 34 has LEDs 102 in close proximity as described above. The user interface module 54 includes a 5-inch LCD display 150 that extends out from the front panel, a USB connector 152 for interfacing with a USB compatible device and a stylus opening 154 for storing a stylus for the display 150. The user interface module 54 also includes an RFID antenna 159 around a perimeter of the display 150 as shown. The RFID antenna can read RFID tags and transfer media information to the RFID reader on the management board 56 within the controller 52, which can then be stored and used by the controller 52.

Figure 16:
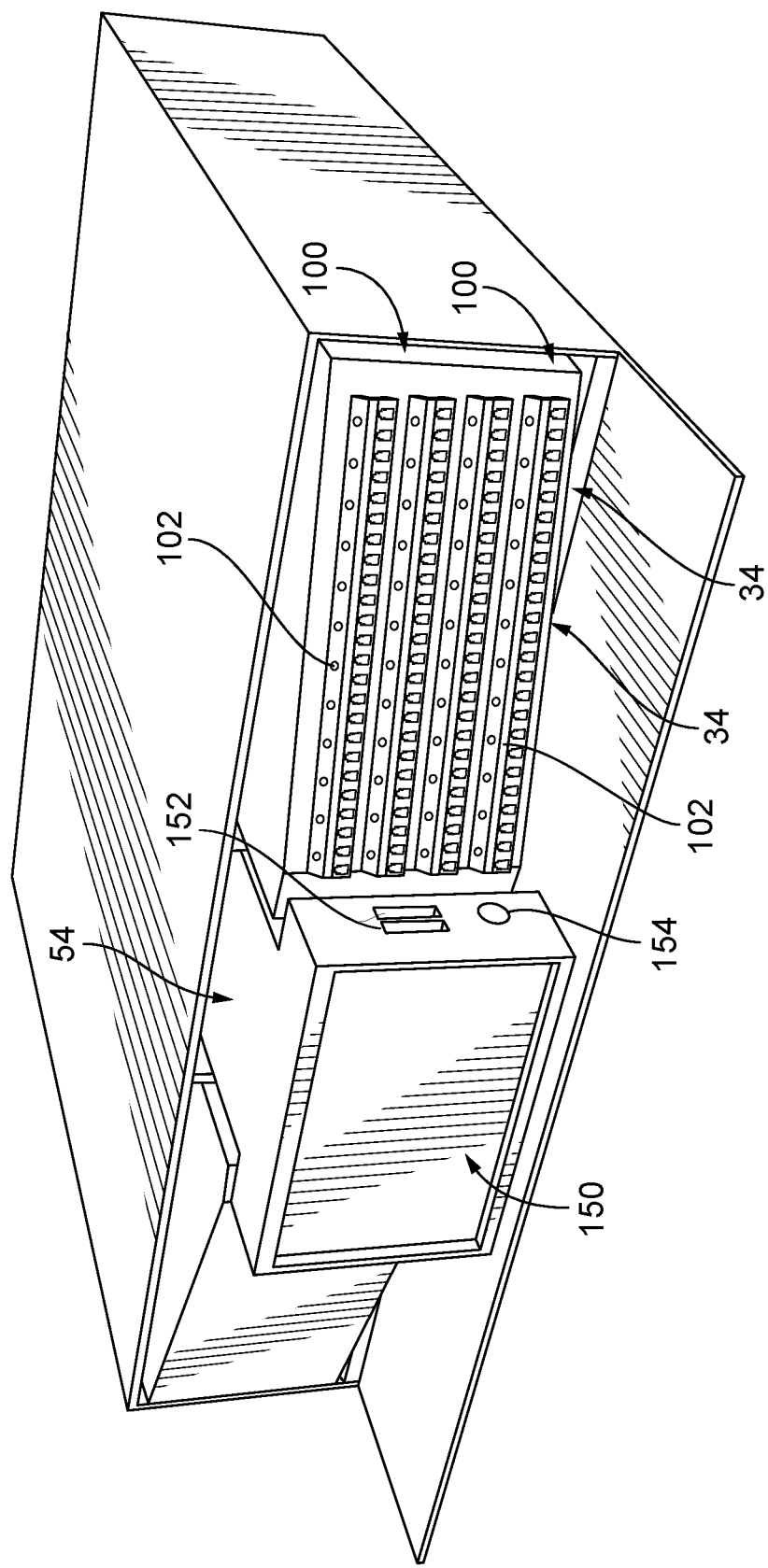
FIG. 16 is another exemplary embodiment of a front panel configuration for the housing of the connectivity appliance according to the present disclosure, illustrating a central management module and a patch panel module on one side of the management module and facing at an angle relative to the management module.

In FIG. 16, the connectivity appliance 10 has a 2RU housing 20 and the front panel 28 has one low-density adapter module group associated with patching module 80b and a user interface module 54 of the management module 50. The group of low-density adapter modules 100 includes four stacked low-density adapter modules that are angled so that the low-density connectors face at an angle relative to the display as shown. The stack has an upper row, two intermediate rows and a lower row. Each row has 6 quad LC adapters 34. Each LC connector pair in each quad LC adapter 34 has LEDs 102 in close proximity as described above. The user interface module 54 includes a 5-inch LCD display 150 that extends out from the front panel, two USB connectors 152 for interfacing with multiple USB compatible devices and a stylus opening 154 for storing a stylus for the display. The user interface module 54 may also include an RFID antenna around a perimeter of the display similar to the antenna 159 shown in FIG. 15. The RFID antenna can read RFID tags and transfer media information to the RFID reader on the management board 56 within the controller 52, which can then be stored and used by the controller 52.

Figure 17:
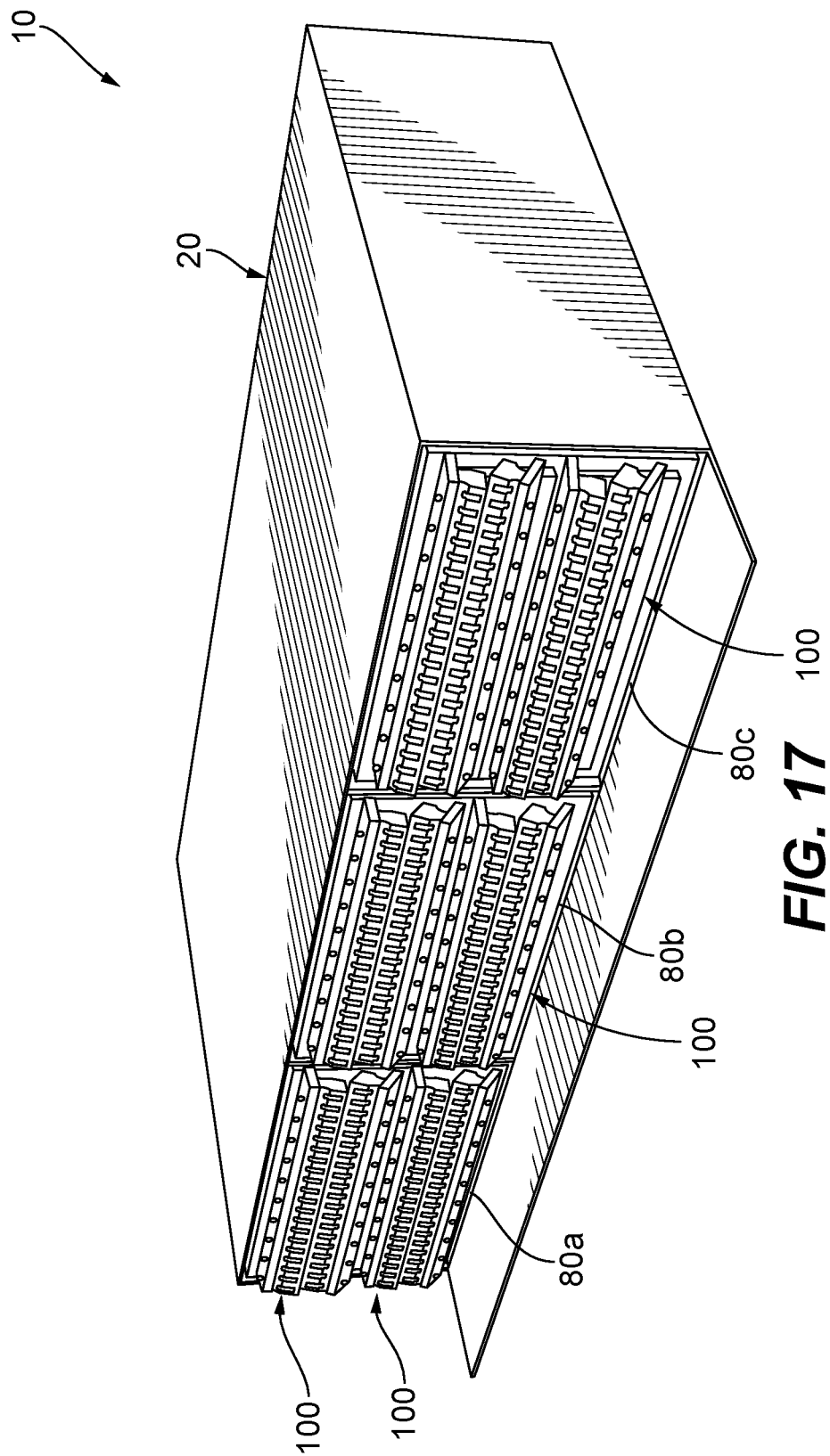
FIG. 17 is another exemplary embodiment of a front panel configuration for the housing of the connectivity appliance according to the present disclosure, illustrating multiple patch panel modules in a side-by-side arrangement.

In FIG. 17, the connectivity appliance 10 has a 2RU housing 20 and the front panel 28 has three low-density adapter module groups (one group associated with patch panel module 80a, one group associated with patch panel module 80b and one group associated with a third patch panel module 80c). The low-density adapter modules 100 in the first group includes two sets of stacked low-density adapter modules 100. Each stack has an upper row and a lower row and each row has 6 quad LC adapters 34. Each LC connector pair in each quad LC adapter 34 has LEDs 102 in close proximity as described above. Similarly, the low-density adapter modules 100 in the second group includes two sets of stacked low-density adapter modules 100. Each stack has an upper row and a lower row and each row has 6 quad LC adapters 34. Each LC connector pair in each quad LC adapter 34 has LEDs 102 in close proximity as described above. Similarly, the low-density adapter modules 100 in the third group includes two sets of stacked low-density adapter modules 100. Each stack has an upper row and a lower row and each row has 6 quad LC adapters 34. Each LC connector pair in each quad LC adapter 34 has LEDs 102 in close proximity as described above.

It should be noted that the size of the display 150 is determined in part by the size of the housing 20. More specifically, the housing in the above described exemplary embodiments are 2RU housings. If the housing is configured as a 3RU or larger housing, the size of the display may be larger such as a 6-inch LCD display.

In the exemplary embodiments described herein the patch panel modules 80 have high density ports or adapters, e.g., MPO adapters 36, associated with the rear panel 30 and low-density ports or adapters, e.g., LC adapters 34, associated with the front panel 28. However, the present disclosure also contemplates embodiments where the patch panel modules 80 would only be accessible from the front panel, such that there would be no ports or connectors (and associated LEDs) accessible from the rear panel. In such cases the high-density and/or low-density ports or adapters would all be accessible from the front panel via the patch panel modules. In other embodiments, the patch panel modules 80 may have high-density ports or adapters associated with the front panel 28 and low-density ports or adapters associated with the rear panel 30. In other embodiments, the patch panel modules 80 may have combinations of high-density and low-density ports or adapters associated with the front panel 28, and high and low-density ports or adapters associated with the rear panel 30.

Figure 18:
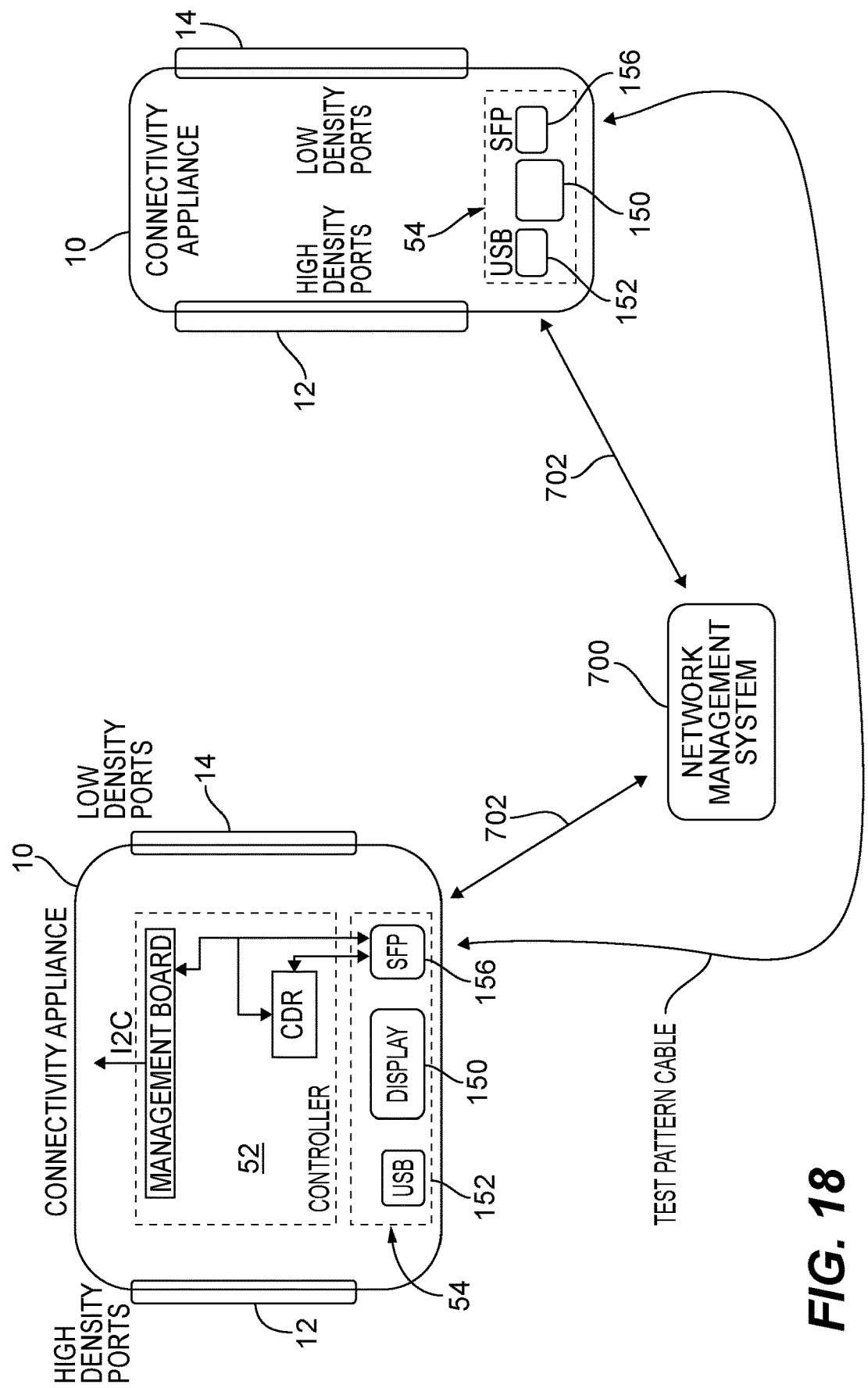
FIG. 18 is a functional block diagram of a tester module for the connectivity appliance according to the present disclosure.

Referring to FIG. 18, the connectivity appliance 10 may include a test module where the controller 52 of the management module 50 includes a pseudo-random binary sequence generator that outputs from an SFP transceiver (SFP cage) a test pattern used to validate the integrity of the connection between two or more connectivity appliances 10 by injecting the test pattern at one end, receiving the pattern at a similarly equipped endpoint on, for example, a second connectivity appliance 10, and analyzing the data at the second connectivity appliance 10. Additional test capabilities include, but are not limited to power level monitoring, Visual Fault Locator (VFL), and test capabilities. It is noted that an external diagnostic device can be used with the connectivity appliance for monitoring and generating test patterns to and from the connectivity appliance utilizing known and custom test patterns and capabilities to provide analysis of the quality of the cable connectivity. Such an external diagnostic device may come in the form of a dongle that is plugged into, for example, a USB connector or port 152 on the connectivity appliance 10.

Figure 19:
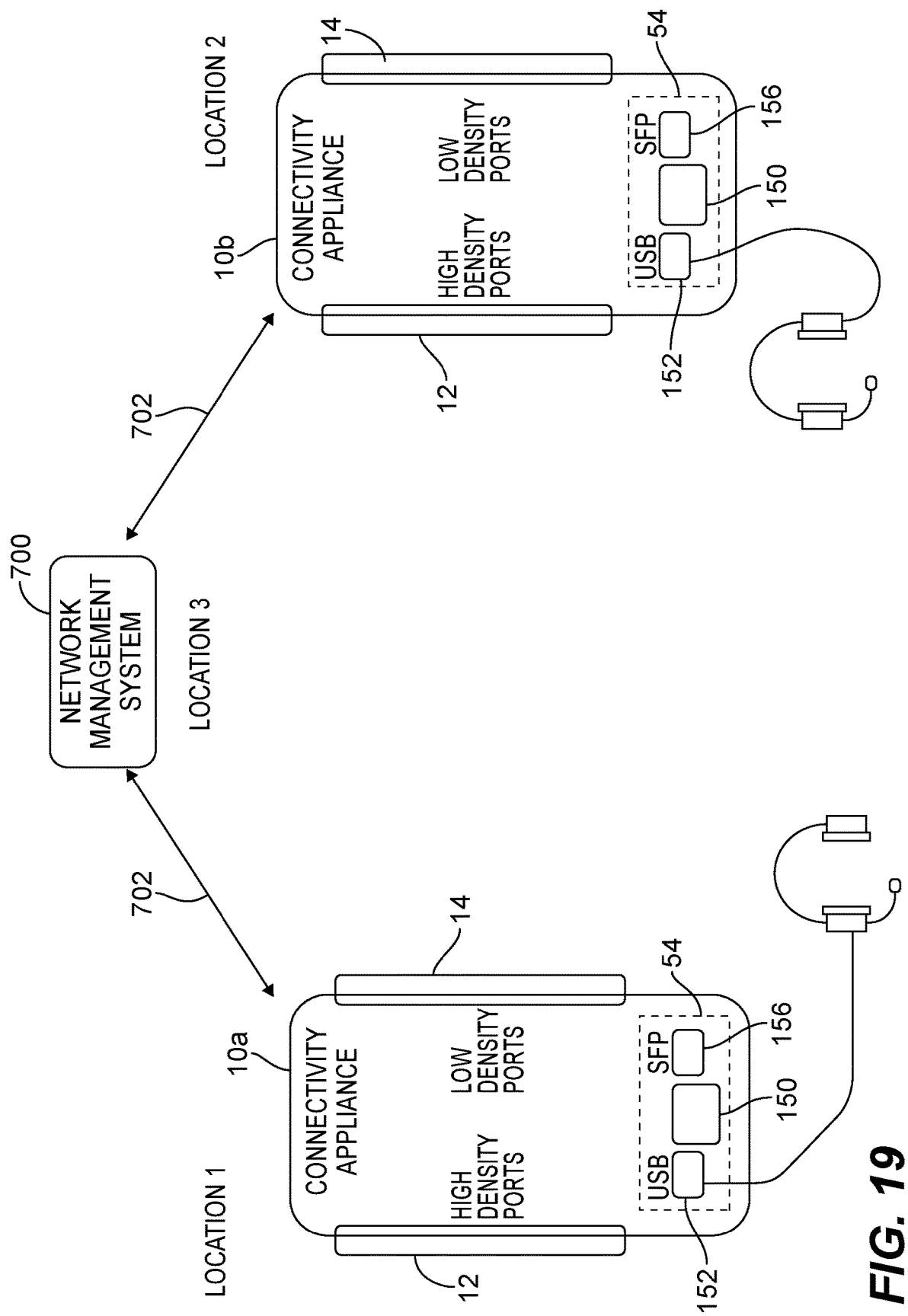
FIG. 19 is a functional block diagram of a closed-circuit communication interface for the connectivity appliance according to the present disclosure.

Referring to FIG. 19, as noted above, the connectivity appliance 10 may include one or more USB connectors or ports 152 that may be configured by the network management system 700 to provide a closed-circuit communication path so that, for example, a technician on one location can communication to a technician in another location. For example, a first technician in location 1 can connect a USB headset into the USB port 152 in the connectivity appliance 10a, as shown, and a second technician in location 2 can connect a USB headset into the USB port 152 in the connectivity appliance 10b, as shown. The first technician can then initiate communication with the second technician via the management modules 50 in the connectivity appliances 10a and 10b directly and with the network management system 700 via communication paths 702.

Figure 20:
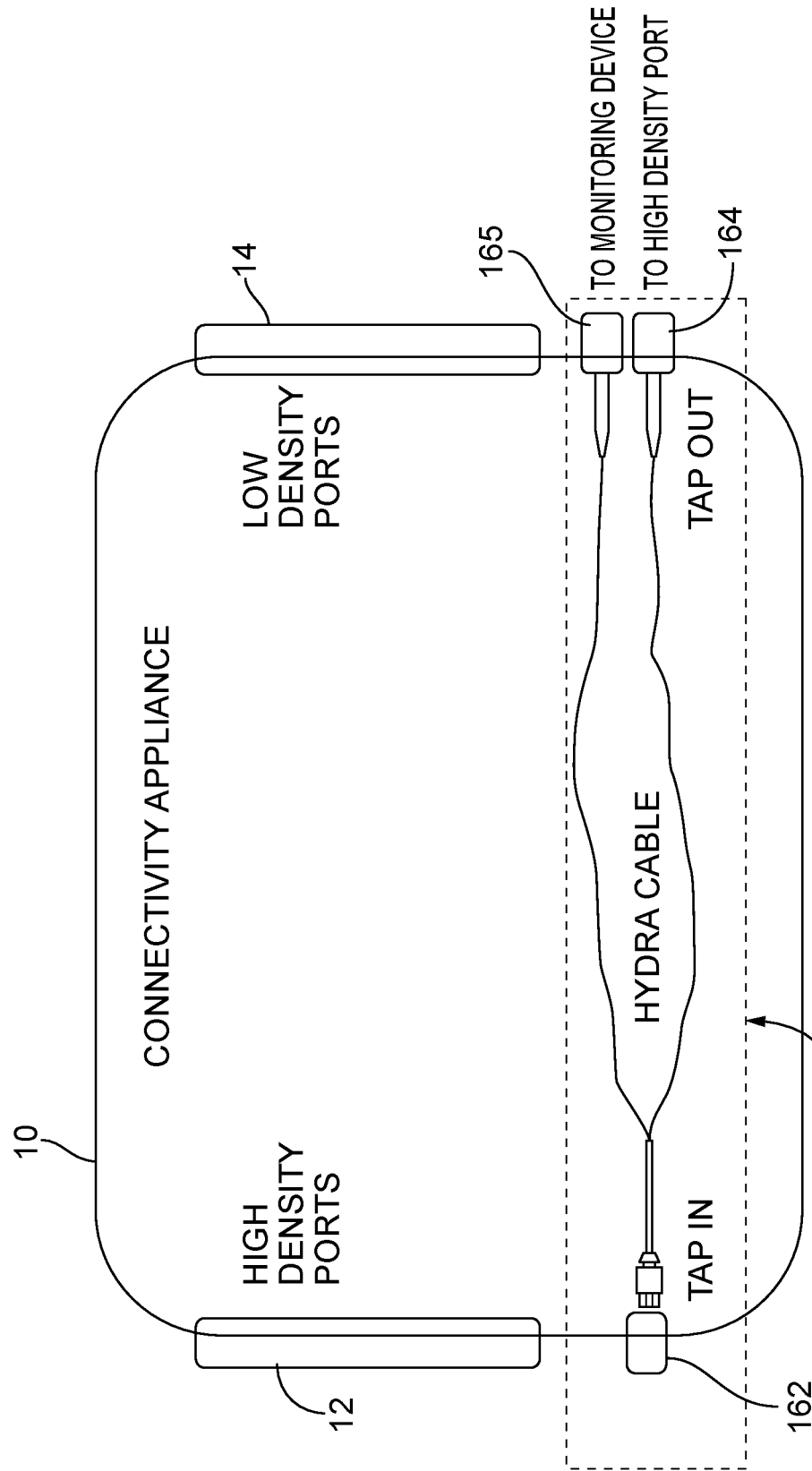
FIGS. 20 and 20a are functional block diagrams of tap modules for the connectivity appliance according to the present disclosure.

Referring to FIG. 20, the connectivity appliance 10 may include a tap module 160 that includes one or more tap assemblies. Each tap assembly includes a tap input connector or port 162, a primary output port 164 and a monitor output port 165. In a typical embodiment, ports 162, 164, and 165 would be LC connectors. The tap assemblies are provided to permit the monitoring of data traffic moving through a particular optical fiber connected to the connectivity appliance 10. In another embodiment, a patching module 80 may consist of a high-density adapters 36 with hydra cables which would break out each of the individual fibers into tapping modules which in turn would create monitoring outputs 165 and tap outputs 164. The individual monitoring outputs 165 and tap outputs 164 can be configured as LC connectors 88 or bundled back into high density MPO connectors 86 with the end destination ports 164 connected to a network appliance 600 and the monitor ports 165 connected to a traffic analyzer or recoding appliance (not shown).

Figure 20A:
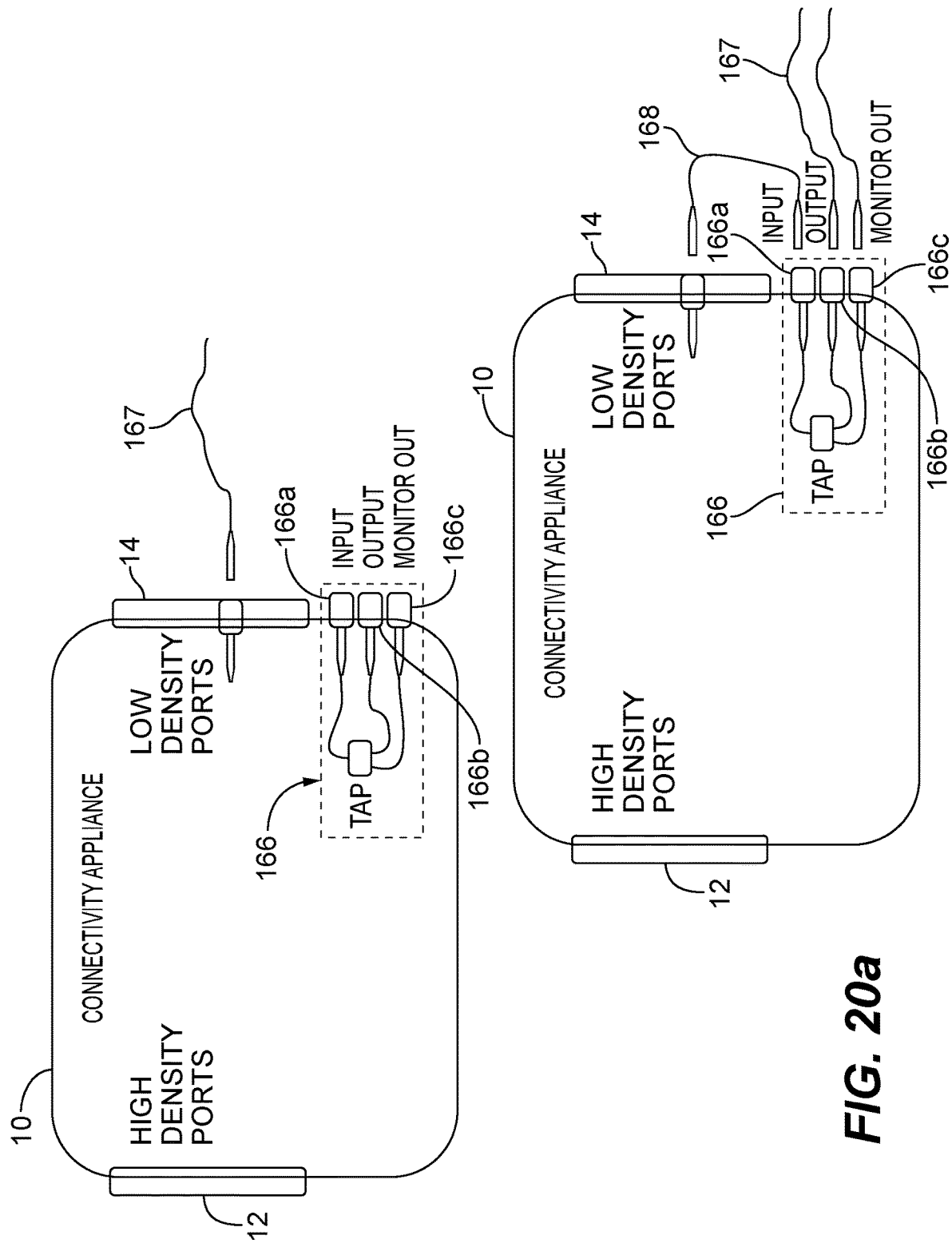
Figure 21:
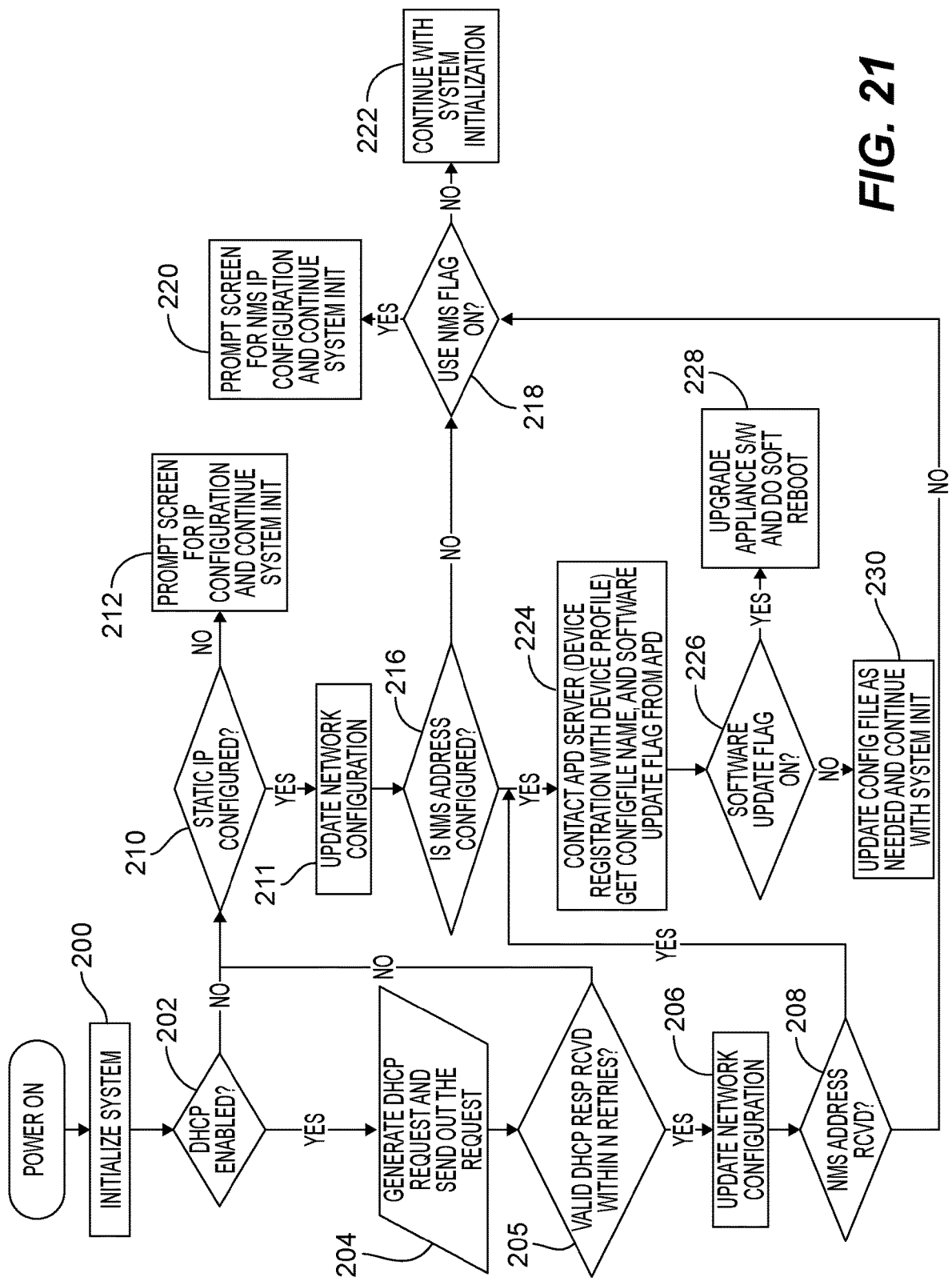
FIG. 21 is a functional flow diagram of an automatic configuration process within the connectivity appliance according to the present disclosure.

Referring to FIG. 20a, another exemplary embodiment of the connectivity appliance 10 according to the present disclosure is shown. In this exemplary embodiment, the connectivity appliance 10 includes a tap module 166 installed within the connectivity appliance and accessible from the front panel 28 such that a technician can 1) disconnect a communication path 167, e.g., a fiber or copper cable, to a distant end point that is connected to a low-density connector on the front panel 28 (or the rear panel 30), and instead connect a jumper 168 from the low-density port on the front panel 28 to the input connector or port 166*a* of the tap module 166, 2) connect the cable 167 to the output connector or port 166*b* of the tap module 166, and 3) connect a low-density cable connector of a low-density cable connected to a path monitoring device to a monitor output connector or port 166*c* of the tap module 166. The tap implementation shown in FIG. 20*a* takes the transmit and receive paths of the low-density port path and interconnects the transmit and receive in the correct direction between the two endpoints while coupling the transmit sides of both near and far endpoints to the monitor outputs.

Connectivity Appliance CPU Operation

As noted above, the connectivity appliance 10 of the present disclosure can frontend one or more network devices 500 and extends aggregated interfaces to low density ports or lower density pairs of ports, e.g., simplex pairs of ports. A function of the connectivity appliance 10 is to split or breakout the aggregated fibers to individual ports. The connectivity appliance 10 has a management module 50 and one or more patch panel modules 80 with LED indicators for each port as described above. The management module 50 of the connectivity appliance 10 can run independently or it can be run as a slave to a remote device or platform. The management module 50 either independently or as a slave can manage the application program interface (API) to network devices connected to the connectivity appliance 10.

1. Network Device Controlling Connectivity Appliance

A network device 500 that includes any platform with software or hardware able to communicate to the connectivity appliance 10 via a defined Application Program Interface (API) can be used with the connectivity appliance of the present disclosure. The API includes any method of communicating to the connectivity appliance. For example, a Restful API, JSON format can be used to communicate with the connectivity appliance. In this exemplary embodiment, the network device 500 is the master and controls and/or feeds information to the connectivity appliance 10 acting as a slave device. An example of the communication protocol may consist of:

Step 1. Start API
Step 2. Wait to receive command from controlling network device
Step 3 If network device Status/Information is requested:
  a. Handle request by reporting status/information regarding the connectivity appliance, e.g., the connectivity appliance ID, the hardware version, the software revision, etc. A response to the request can also include environment status such as power supply status, or temperature status, etc.
  b. Return to Step 2
Step 4. If Port/Interface control is requested:
  a. Set port status LED to specified state. The state can include color, mode (blinking and rate of blink) etc.
  b. Save configuration changes to database.
  c. Return to Step 2
Step 5. If port status LED status is requested:
  a. Report back last LED state
  b. Return to Step 2

2. Connectivity Appliance Association to Network Device Interfaces

A network device 500 that includes any platform with software or hardware able to communicate to connectivity appliance 10 via a defined Application Program Interface (API) can be used with the connectivity appliance of the present disclosure. The API includes any method of communicating between the connectivity appliance 10 and the network device 500. In this exemplary embodiment, the connectivity appliance 10 is the master and polls the network device 500 for information, such as cable information for connectors inserted into the port adapters. The information received from the network device 500 is then parsed via the management module 50 and the UI controller 76 sets the state of the LEDs 102 (e.g., the color, mode, etc.) on the front panel 28 and/or the rear panel 30. In this embodiment, there are two processes used, a configuration process and an interface polling process. An example of the communication protocol may consist of:

Process #1, Configuration Process.
Step 1. Start Configuration API
Step 2. Wait to receive command
Step 3. If the network device Status/Information is requested:
  a. Handle request by reporting status/information, such as the connectivity appliance ID, the hardware version, the software revision, etc. A response can also be an environment status, such as power supply, temperature, etc.
  b. Return to Step 2
Step 4. If the network device Configure Device IP address and communication method is requested:
  a. Configure the IP address of the network device and the communication method.
  b. When configured, access network device and retrieve the API information then create entries in the connectivity appliance's 10 database for each retrieved API.
  c. Return to Step 2
Step 5. If Associate the FPA port to network device interface is requested:
  a. Retrieve the network device's API interface information from the connectivity appliance's database.
  b. Configure the FPA's port on network device interface entry.
  c. Return to Step 2
Step 6. If set POLL time requested:
  a. Set the polling time used to poll the network devices API,
Process #2, Interface Polling Process
Step 1. Start Interface polling
Step 2. Wait for POLL time to elapse
Step 3. Poll all network devices 500 connected to the connectivity appliance 10 using known specific communication API protocols stored in the connectivity appliance's database for each network device to be polled.
Step 4. Update the connectivity appliance's database with the information retrieved from each network device polled and then control the LEDs 102 based on received information. The LEDs can be set to a color and mode based on predefined criteria. For example:
  a. If Interface is 'Administratively and Operationally up' then turn its corresponding LED to 'Solid Green'
  b. If Interface is 'Administratively up' but 'Operationally down' then turn its corresponding LED 'off'
  c. If Interface has an 'Alarm' then turn its corresponding LED 'fast blinking Red'

3. Connectivity Appliance Virtual Display

A network device 500 that includes any platform with software or hardware able to communicate to the connectivity appliance 10 via a defined Application Program Interface (API) can be used with the connectivity appliance of the present disclosure. The API includes a method of communicating between the connectivity appliance 10 and the network device 500. The connectivity appliance 10 can be either a slave device or a master device such that information is set by network device or poll/received by the connectivity appliance. This embodiment relies on the methods for receiving request/information about interface, described in 1 or 2 above. The connectivity appliance's controller 52 can act as a virtual machine. The controller 52 can provide either a tabular format with the connection characteristics of each port status or a virtual display of the connectivity appliance and its LED status to the requesting network device 500. The virtual display can be on any network device or appliance, local to connectivity appliance or on a mobile device with an application designed to display the connectivity appliance status for example.

Automatic Configuration

Referring to FIGS. 1, 21, 23 and 24, the connectivity appliance 10 includes an auto-configuration process that permits untrained or modestly trained personnel to install the connectivity appliance within a rack and to start up the connectivity appliance to a point where it is operational. This includes for example automatically registering the connectivity appliance 10 with the network management system 700 so that they can communicate with each other, automatically installing software updates and upgrades as needed and automatically downloading configuration files. To configure the connectivity appliance 10 after installation, the connectivity appliance is powered on and goes through an initialization process (step 200) in FIG. 21. At this time the display 150 on the connectivity appliance may display an initialization status as shown in for example FIG. 23. The connectivity appliance checks to determine if the dynamic host configuration protocol (DHCP) has been enabled (step 202). If the DHCP is enabled, the connectivity appliance generates a DHCP request and sends the request to the network management system 700 (step 204) and waits for a valid DHCP response from the network management system (step 205). If a valid DHCP response is received within a predetermined number of attempts, e.g., 10 attempts, the network configuration is updated in the connectivity appliance (step 206) and the connectivity appliance determines if the IP address of the network management system has been received (step 208).

Figure 24:
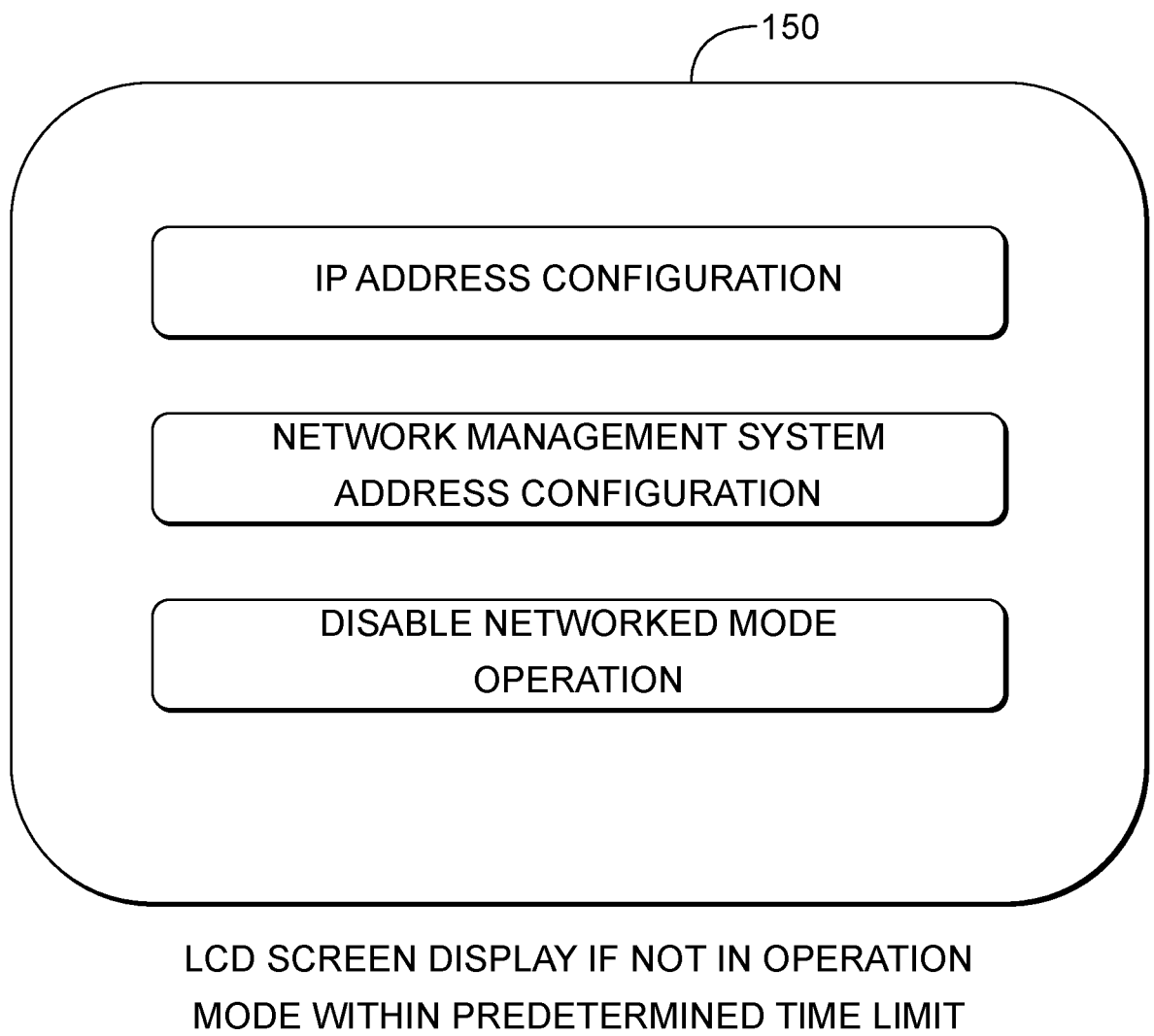
FIG. 24 is another exemplary automatic configuration start-up screen on the display of the connectivity appliance according to the present disclosure.

Returning to step 205, if a valid DHCP response is not received, the connectivity appliance determines if a static IP address for the network management system 700 has been configured (step 210). If the static IP address of the network management system 700 has not been configured, the display 150 on the connectivity appliance 10 prompts the technician to input the static IP address and when entered returns to the system initialization (step 212) as shown in FIG. 24. If the static IP address of the network management system 700 has been configured, the network configuration in the connectivity appliance 10 is updated (step 214) and the connectivity appliance determines if the IP address of the network management system has been configured (step 216). If in step 216 the network management system IP address has not been configured, the connectivity appliance determines if the Use Network Management System flag is set to "On" (step 218). If the connectivity appliance determines the Use Network Management System flag is set to "On," the display 150 on the connectivity appliance 10 prompts the technician to input the network management system's IP configuration and when entered returns to the system initialization (step 220) as shown in FIG. 24. If the connectivity appliance determines the Use Network Management System flag is not set to "On," the connectivity appliance 10 continues with the system initialization (step 222) by selecting the disable networked mode operation shown in FIG. 24.

Returning to step 216, if the network management system IP address has been configured, the connectivity appliance 10 communicates with the network management system 700 to retrieve the configuration file (ConfigFile) and the software update flag status to determine if software updates are available for download (step 224). The connectivity appliance then determines if the software update flag status is set to "On" (Step 226). If the software update flag status is set to "On," the connectivity appliance downloads the software to be updated, installs the software update and reboots the connectivity appliance to complete the software update process (step 228). If the software update flag status is not set to "On," the connectivity appliance updates the configuration file (ConfigFile) and continues with the system initialization (step 230).

Figure 22:
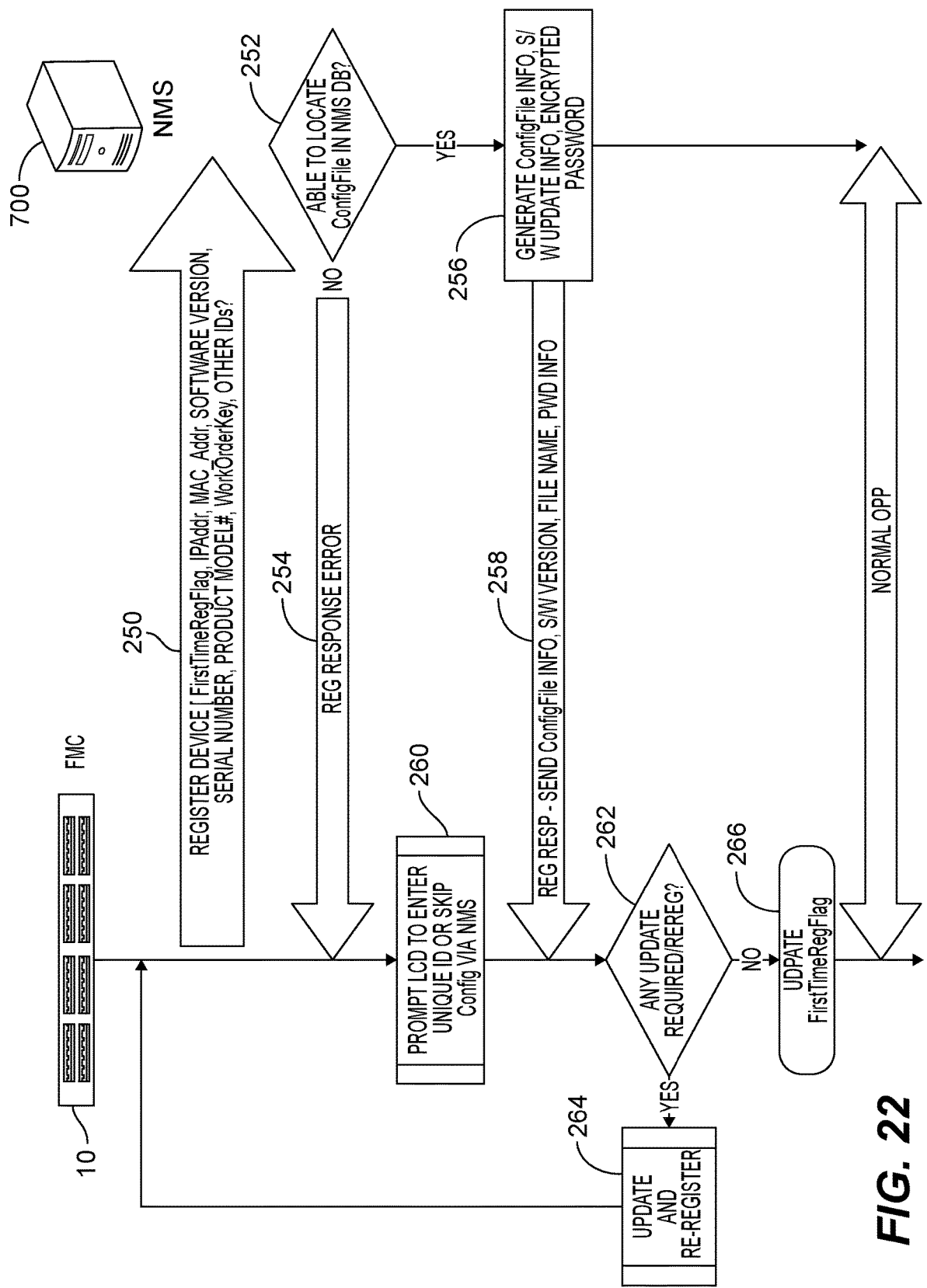
FIG. 22 is another functional flow diagram associated with the automatic configuration process within the connectivity appliance.
Figure 23:
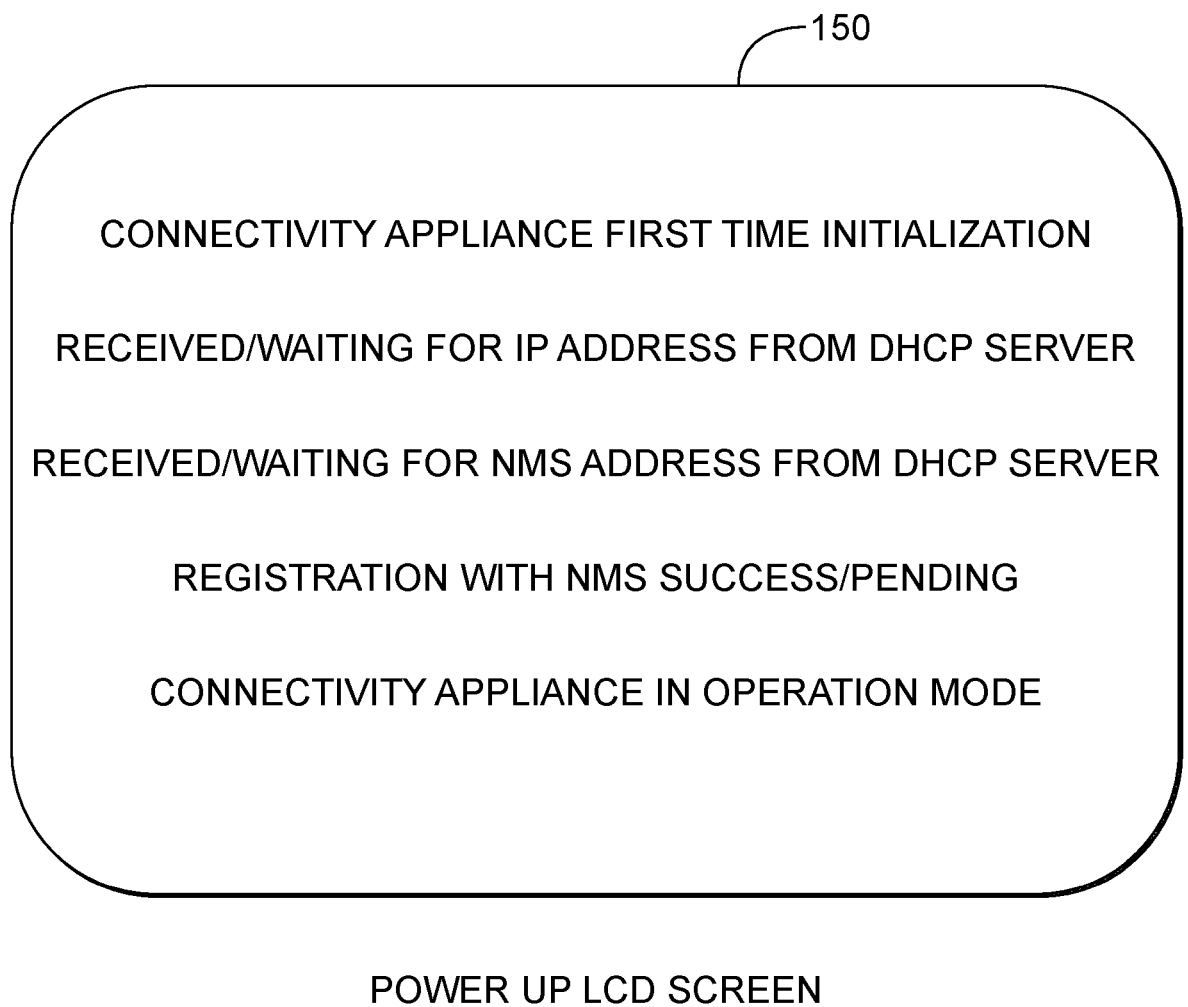
FIG. 23 is an exemplary automatic configuration start-up screen on a display of the connectivity appliance according to the present disclosure.
Figure 25:
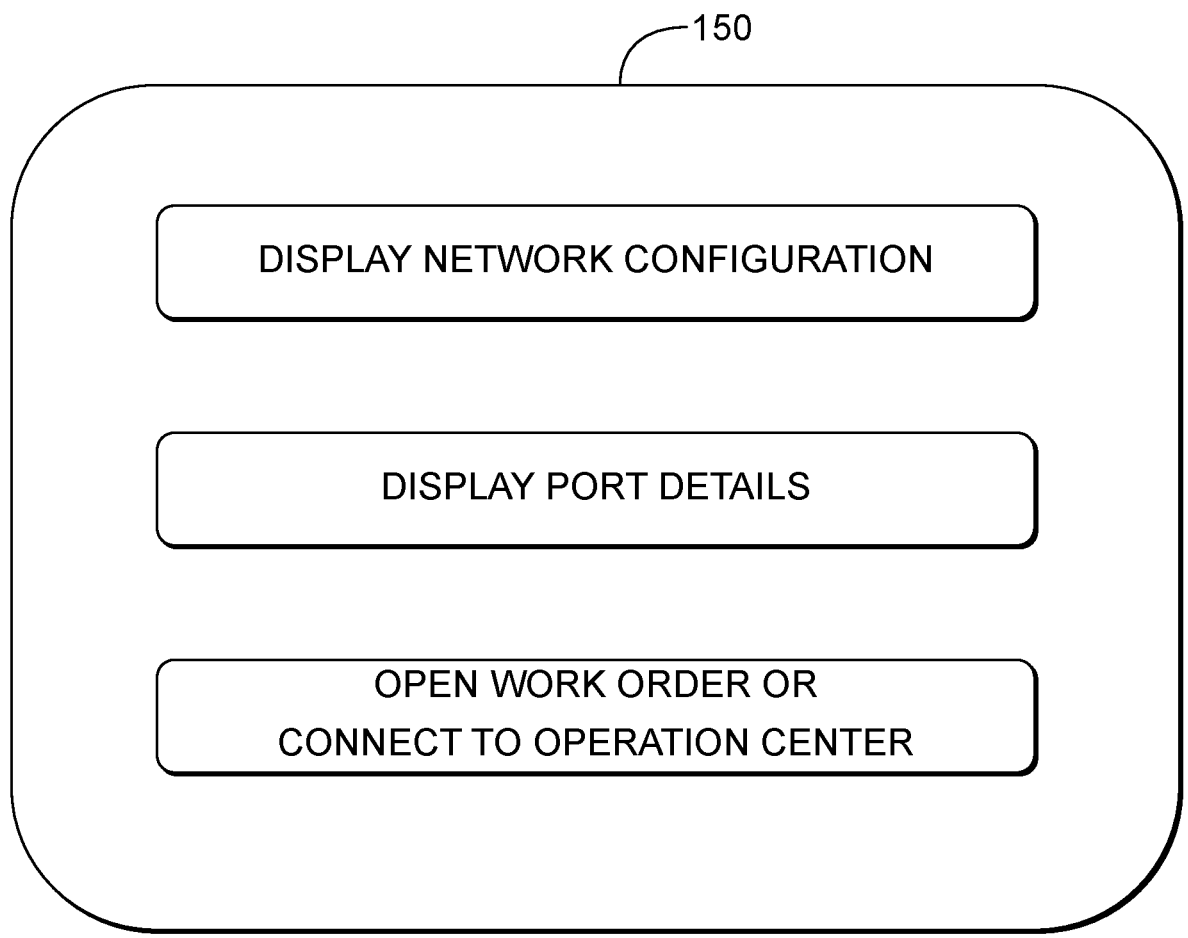
FIG. 25 is another exemplary screen on the display of the connectivity appliance according to the present disclosure in an operational mode.

Referring to FIGS. 1, 22 and 25, an example of automatically registering the connectivity appliance 10 with the network management system 700 is described. Initially, the connectivity appliance 10 sends information to the network management system 700 for registering the connectivity appliance with the network management system (step 250). Non-limiting examples of such information includes a first time register flag, IP address, MAC address, software version the connectivity appliance is running, the connectivity appliance serial number, connectivity appliance model number, one or more work order keys, and other relevant identification information of the connectivity appliance. The network management system determines if the configuration file (ConfigFile) for the connectivity appliance is stored in the network management system database (step 252). If the configuration file (ConfigFile) for the connectivity appliance is not stored in the network management system database, a registration error response is sent from the network management system 700 to the connectivity appliance 10 (step 254). If the configuration file (ConfigFile) for the connectivity appliance is stored in the network management system database, the network management system 700 generates configuration file information, software update information, e.g., software version and file name, and encrypted password information (step 256). The network management system 700 then sends a response to the connectivity appliance 10 that includes the generated configuration file information, software update information and encrypted PWD information (step 258). If at step 254 a registration response error is received by the connectivity appliance 10, the connectivity appliance prompts the technician via the display 150 to enter the connectivity appliance ID (step 260). After the network management system 700 then sends a response to the connectivity appliance 10 that includes the generated configuration file information, software update information and encrypted PWD information in step 258, or the connectivity appliance ID is entered by the technician in step 260, the connectivity appliance determines if any configuration updates and/or if the registration process should be re-executed (step 262). If there are configuration updates and/or the registration process should be re-executed, the connectivity appliance re-executes the registration process (step 264). If there are no configuration updates and/or the registration process should not be re-executed, the connectivity appliance updates the first-time registration flag to reflect that the connectivity appliance 10 has be registered with the network management system 700 (step 266) and the connectivity appliance is in a normal operation mode, which may cause the connectivity appliance to display on display 150 the screen prompts shown in FIG. 25.

Work Order Flow

Figure 26:
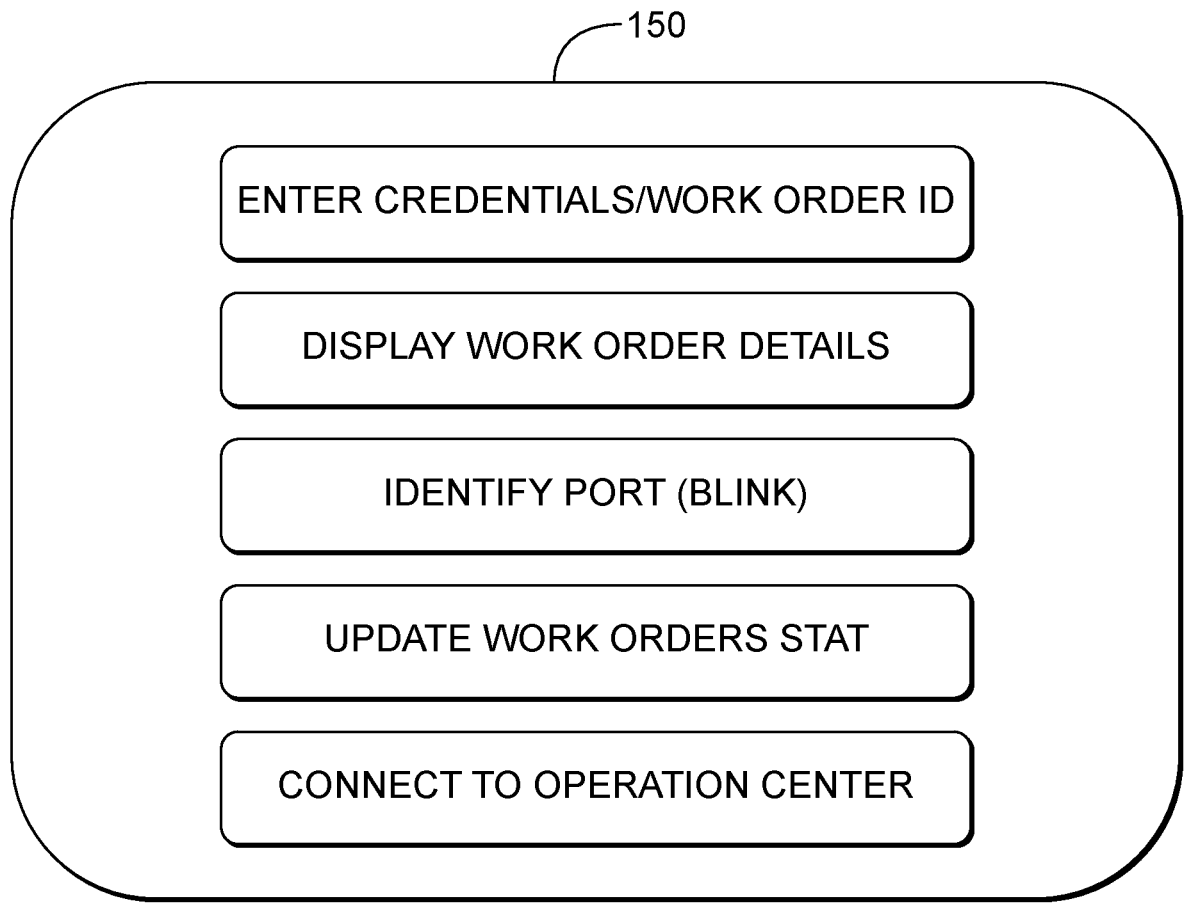
FIG. 26 is an exemplary work order operation screen on the display of the connectivity appliance according to the present disclosure.

As noted connectivity appliance 10 is capable of guiding untrained or modestly trained personnel through work orders so that fiber optic cables can be connected to the proper ports in the connectivity appliance. In other words, the management module within the connectivity appliance can manage fiber optic cable installation, moves, adds or other changes so that untrained or modestly trained personnel can be used manage the connectivity appliance. The connectivity appliance 10 is also capable of verifying that the cable connections made by the technicians are proper connections. Using the media reader and/or the RFID reader described herein, work order flows can be displayed to provide easy instructions where the technician should insert a certain cable connector in a certain high-density or low-density port. The management module 50 or the management module in combination with the network management system 700 can use the media reader and/or the RFID reader to verify the proper cable connectors are in the proper connectivity appliance connectors. FIG. 26 is an exemplary screen shot for a work order work flow where the technicians credentials are checked prior to launching the workflow and other operations of an exemplary work order. The work order flow is intended to be a logical instruction procedure for the technician to perform modifications to the connectivity appliance's high-density and/or low-density port connections. The instructions are downloaded or retrieved from the network management system 700 and can vary depending upon the work to be performed. More specifically, the technician initially enters their technician ID and password into the connectivity appliance 10 via the touch display 150 (or a keypad). Once the technician ID and password are input into the connectivity appliance a request is sent from the connectivity appliance to the network management system 700 to download the instructions for this technician for the specific connectivity appliance. The received instructions are then displayed on the display 150 of the connectivity appliance 10 instructing the technician in a step by step fashion how to perform one or more changes to the connectivity appliance's high-density and/or low-density port connections. For example, the instructions may include the following instructions:

Step 1: remove the cable from port 4 and place it aside; and

Step 2: inset a replacement cable into port 4.

As the technician performs these steps, the connectivity appliance 10 verifies that the cable has been removed from port 4 by detecting that a cable connector is no longer present in port 4, and that a new cable has been inserted into port 4 by detecting the presence of a cable connector in port 4 and by reading the cable connector information on the media reading interface of port 4.

What is claimed is:

1. A network connectivity appliance comprising:
a housing having a front panel and a rear panel;
at least one high-density adapter positioned to be accessible from the front panel or the rear panel;
at least one high-density indicator positioned in close proximity to the high-density adapter, wherein each high-density indicator is visible from an exterior of the front panel or the rear panel;
a plurality of low-density adapters positioned to be accessible from the front panel or the rear panel, the plurality of low-density adapters being arranged in low-density connector pairs;
a low-density indicator associated with each of the low-density connector pairs, wherein each low-density indicator is positioned in close proximity to its respective low-density connector pair, and wherein each low-density indicator is visible from an exterior of the front panel or the rear panel;
a fiber optic cable assembly having a one end connected to the at least one high-density connector and that splits fiber connections from the at least one high-density connector to the plurality of low-density connectors; and
a management module positioned within the housing and configured to control the at least one high-density indicator and each of the low-density indicators based upon predefined criteria.

2. The network connectivity appliance according to claim 1, wherein the plurality of low-density connectors comprise single fiber connectors.

3. The network connectivity appliance according to claim 2, wherein the single fiber connectors comprise LC, FC, SC and ST connectors.

4. The network connectivity appliance according to claim 1, wherein the at least one high-density fiber connector comprises a multi-fiber connector.

5. The network connectivity appliance according to claim 1, wherein the at least one high-density fiber connector comprises at least one MPO connector.

6. The network connectivity appliance according to claim 1, wherein the at least one high density fiber connector comprises at least one MXC connector.

7. The network connectivity appliance according to claim 1, wherein the fiber optic cable assembly comprises a hydra cable.

8. The network connectivity appliance according to claim 1, wherein the fiber optic cable assembly comprises a fanout cable.

9. The network connectivity appliance according to claim 1, wherein the fiber optic cable assembly comprises a breakout cable.

10. The network connectivity appliance according to claim 1, wherein the at least one high-density indicator comprises at least one LED.

11. The network connectivity appliance according to claim 1, wherein the low-density indicator associated with each of the low-density connector pairs comprises a LED.

12. A network connectivity appliance comprising:
a housing having a front panel and a rear panel;
at least one patch panel module positioned in the housing, the at least one patch panel module comprising:
at least one high-density adapter positioned to be accessible from the rear panel;
at least one high-density indicator positioned in close proximity to the at least one high-density adapter, wherein each high-density indicator is visible from an exterior of the rear panel;
a plurality of low-density adapters positioned to be accessible from the front panel, the plurality of low-density adapters being arranged in low-density connector pairs;
a low-density indicator associated with each of the low-density connector pairs, wherein each low-density indicator is positioned in close proximity to its respective low-density connector pair, and wherein each low-density indicator is visible from an exterior of the front panel;
a fiber optic cable assembly having a one end connected to the at least one high-density connector and that splits fiber connections from the at least one high-density connector to the plurality of low-density connectors; and a management module positioned within the housing and configured to control the at least one high-density indicator and each of the low-density indicators based upon predefined criteria.

13. The network connectivity appliance according to claim 12, wherein the plurality of low-density connectors comprise single fiber connectors.

14. The network connectivity appliance according to claim 13, wherein the single fiber connectors comprise LC, FC, SC and ST connectors.

15. The network connectivity appliance according to claim 12, wherein the at least one high-density fiber connector comprises a multi-fiber connector.

16. The network connectivity appliance according to claim 12, wherein the at least one high-density fiber connector comprises at least one MPO connector.

17. The network connectivity appliance according to claim 12, wherein the at least one high density fiber connector comprises at least one MXC connector.

18. The network connectivity appliance according to claim 12, wherein the fiber optic cable assembly comprises a hydra cable.

19. The network connectivity appliance according to claim 12, wherein the fiber optic cable assembly comprises a fanout cable.

20. The network connectivity appliance according to claim 12, wherein the fiber optic cable assembly comprises a breakout cable.

21. The network connectivity appliance according to claim 12, wherein the at least one high-density indicator comprises at least one LED.

22. The network connectivity appliance according to claim 12, wherein the low-density indicator associated with each of the low-density connector pairs comprises a LED.

* * * * *